US012573832B2

(12) United States Patent (10) Patent No.: US 12,573,832 B2
Gaillard et al. (45) Date of Patent: Mar. 10, 2026

(54) CONDUCTOR BRACING SYSTEM

(71) Applicant: ERICO International Corporation, Solon, OH (US)

(72) Inventors: Guillaume Gaillard, Veauche (FR); Pascal Godard, St. Georges Haute Ville (FR); Frederic Bizet, Chatilllon d'Azergues (FR)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/627,794

(22) Filed: Apr. 5, 2024

(65) Prior Publication Data

US 2024/0339822 A1 Oct. 10, 2024

Related U.S. Application Data

(60) Provisional application No. 63/494,832, filed on Apr. 7, 2023.

(51) Int. Cl.
 *H02G 15/007* (2006.01)
 *H02B 1/20* (2006.01)
(52) U.S. Cl.
 CPC ............. *H02G 15/007* (2013.01); *H02B 1/20* (2013.01)
(58) Field of Classification Search
 None
 See application file for complete search history.

(56) References Cited

U.S. PATENT DOCUMENTS

| 2,318,859 A | 5/1943 | Huguelet | |
| 2,733,289 A | 1/1956 | Warren et al. | |
| 3,180,924 A | 4/1965 | Rowe | |
| 4,983,132 A | 1/1991 | Weidler | |
| 5,201,484 A * | 4/1993 | Thoen | F16L 3/2235 |
| | | | 248/68.1 |
| 5,828,006 A | 10/1998 | Graham et al. | |
| 5,885,094 A | 3/1999 | Wagener | |
| 6,247,951 B1 * | 6/2001 | Di Liello | H01R 12/61 |
| | | | 439/492 |
| 6,381,122 B2 | 4/2002 | Wagener | |
| 6,489,567 B2 | 12/2002 | Zachrai | |
| 6,549,428 B1 | 4/2003 | Fontana | |
| 6,590,164 B2 | 7/2003 | Zachrai et al. | |

(Continued)

FOREIGN PATENT DOCUMENTS

| DE | 8809666 U1 | 10/1988 |
| DE | 102007029081 A1 | 12/2008 |

(Continued)

*Primary Examiner* — Steven M Marsh
(74) *Attorney, Agent, or Firm* — Quarles & Brady LLP

(57) ABSTRACT

A bracing system for one or more conductors includes a conductor support. The conductor support can include a first clip body and a second clip body. The first clip body can include a first base and a first-clip catches protruding from the first base in a first direction. The second clip body can include a second base and a second-clip catches protruding from the second base in a second direction. The conductor support has a secured configuration to secure a conductor to a building structure or other support structure, in which the conductor extends between the first and second bases and the first-clip catches engage the second clip catches to secure the first clip body to the second clip body.

20 Claims, 17 Drawing Sheets

(56) References Cited

U.S. PATENT DOCUMENTS

| | | | |
|---|---|---|---|
| 6,781,818 B2 | 8/2004 | Josten et al. | |
| 8,289,680 B2 | 10/2012 | Keegan et al. | |
| 8,319,106 B2 | 11/2012 | Wagener | |
| 8,420,934 B2 | 4/2013 | Zhang | |
| 8,664,544 B2 | 3/2014 | Even et al. | |
| 8,783,629 B2 | 7/2014 | Even et al. | |
| 9,190,791 B1 | 11/2015 | Jaena et al. | |
| 9,520,703 B2 | 12/2016 | Jaena et al. | |
| 9,646,738 B2 | 5/2017 | Serdynski et al. | |
| 9,698,548 B2 | 7/2017 | Jaena et al. | |
| 9,698,578 B1 | 7/2017 | Jackson et al. | |
| 9,917,432 B2 | 3/2018 | Serdynski et al. | |
| 9,979,164 B2 | 5/2018 | Baillargeon et al. | |
| 10,164,387 B2 | 12/2018 | Baillargeon et al. | |
| 10,381,812 B2 | 8/2019 | Onodi et al. | |
| 10,461,517 B1 | 10/2019 | Vignes et al. | |
| 10,461,571 B2 | 10/2019 | Nakai et al. | |
| 10,700,503 B2 | 6/2020 | Wiant et al. | |
| 10,720,765 B2 | 7/2020 | Serdynski et al. | |
| 10,958,023 B2 | 3/2021 | Baillargeon et al. | |
| 11,145,434 B2 | 10/2021 | Godard et al. | |
| 12,080,449 B2 | 9/2024 | Godard et al. | |
| 2005/0006535 A1 | 1/2005 | Brown et al. | |
| 2011/0303456 A1 | 12/2011 | Blanchard et al. | |
| 2013/0183089 A1* | 7/2013 | Podsadny | F16B 21/09 |
| | | | 403/376 |
| 2015/0101837 A1* | 4/2015 | Evangelista | H02G 15/113 |
| | | | 29/525 |
| 2017/0038098 A1* | 2/2017 | Braunstein | F24S 25/60 |
| 2022/0102025 A1 | 3/2022 | Godard et al. | |
| 2022/0271522 A1 | 8/2022 | Rois et al. | |
| 2023/0208127 A1* | 6/2023 | Anderson | H02G 15/068 |
| | | | 174/73.1 |
| 2023/0213119 A1* | 7/2023 | Maury | F16L 3/221 |
| | | | 24/459 |

FOREIGN PATENT DOCUMENTS

| | | | |
|---|---|---|---|
| DE | 102007039985 B3 | 12/2008 | |
| EP | 1746321 A1 | 1/2007 | |
| EP | 3042425 B1 | 8/2017 | |
| EP | 2110914 B1 | 12/2017 | |
| EP | 3499668 B1 | 3/2021 | |
| FR | 2717635 B1 | 5/1996 | |
| KR | 10-2290284 B1 | 8/2021 | |
| WO | 2015/032764 A1 | 3/2015 | |
| WO | 2015/044015 A1 | 4/2015 | |

* cited by examiner

CONDUCTOR BRACING SYSTEM

CROSS-REFERENCE TO RELATED APPLICATIONS

This application claims priority to and incorporates by reference U.S. provisional patent application No. 63/494,832, filed Apr. 7, 2023.

BACKGROUND

In some electrical grids, high-to-low voltage transformers or other electrical modules can supply power to power distribution modules, which may in turn distribute the power to individual power taps or access points. For example, a transformer can be linked to a power distribution module that supplies power to the lights, outlets, and any other electronic devices in a residential home or a commercial space. Other transmission of low voltage power between modules may also be useful in a variety of contexts.

SUMMARY

Some examples of the present disclosure can provide improved alignment of conductors relative to an electrical device (e.g., breakers) within a compact space. In some examples, a bracing system for one or more conductors can include a conductor support. The conductor support can include a first clip body and a second clip body. The first clip body can include a first base and first-clip catches protruding from the first base in a first direction. The second clip body can include a second base and second-clip catches protruding from the second base in a second direction. The conductor support can have a secured configuration to secure a conductor to a building structure, in which the conductor extends between the first and second bases and the first-clip catches engage the second clip catches to secure the first clip body to the second clip body.

In some examples, a method of securing one or more conductors can include securing one or more conductor with one or more conductor supports of a bracing system. The conductor support can include first and second clip bodies, each with a base and catches that protrude from the base. The catches of the first clip body can engage the catches of the second clip body to secure the first and second clip bodies together with a conductor extending therebetween.

In some examples, a conductor support can include a first clip body, and a second clip body. The first clip body can include a first base and first-clip catches protruding from the first base in a first direction. The second clip body can include a second base and second-clip catches protruding from the second base in a second direction. The first clip body can be substantially identical to the second clip body and releasably securable to the second clip body to retain a conductor therebetween.

In some examples, a bracing system for conductors can include a conductor support. The conductor support can include a first clip body and a second clip body. The first clip body can include a first clip base and first clip catches extending from the first clip base in a first direction. The first clip catches can include a first cantilevered leg with a distal shoulder and a first deflector leg with a proximal shoulder. The second clip body can include a second clip base and second clip catches extending from the second clip base in a second direction. The second clip body can include a second cantilevered leg with a distal shoulder and a second deflector leg with a proximal shoulder. The conductor support can have a staging configuration where the first clip body and the second clip body can be spaced from each other to receive a conductor between the first clip base and the second clip base. The first deflector leg can be aligned to deflect the second cantilevered leg. The second deflector leg can be aligned to deflect the first cantilevered leg. The conductor support can have a secured configuration where the first clip body and the second clip body can be spaced from each other to secure the conductor between the first clip base and the second clip base. The distal shoulder of the first cantilevered leg can engage the proximal shoulder of the second deflector leg to secure the first clip body to the second clip body. The distal shoulder of the second cantilevered leg can engage the proximal shoulder of the first deflector leg to secure the first clip body to the second clip body.

In some examples, a bracing system to secure one or more conductors can include a conductor support. The conductor support can include a first clip body and a second clip body. The first clip body can include a first clip base and a plurality of first clip catches that protrude from the first clip base in a first direction. Each first clip catch of the plurality of first clip catches can include a shoulder. The second clip body can include a second clip base and a plurality of second clip catches protruding from the second clip base in a second direction, each second clip catch of the plurality of second clip catches including a shoulder. The conductor support can have a secured configuration that secures a conductor between the first clip base and the second clip base, with the plurality of first clip catches extending toward the second clip base. The plurality of second clip catches can extend toward the first clip base, and the shoulders of the plurality of first clip catches can engage the shoulders of the plurality of second clip catches to secure the first clip body to the second clip body.

In some examples, a method of securing one or more conductors using a conductor support can include a first clip body and a second clip body. The method can include securing a first clip base of the first clip body to a support structure in alignment with an electrical device, aligning the first clip body and a second clip body of the conductor support in a staging configuration, in which the first clip base is spaced by a first distance from a second clip base of the second clip body, first clip catches extend from the first clip base, in a first direction, toward the second clip base, second clip catches extend from the second clip base, in a second direction, toward the first clip body, and a conductor extends between the first clip base and the second clip base, and securing the conductor between the first clip base and the second clip base to secure the conductor in alignment for connection with the electrical device, by moving the first and second clip bases toward each other in the first or second directions to engage shoulders of the first clip catches with shoulders of the second clip catches and secure the first clip body to the second clip body with the second clip base spaced from the first clip base by a second distance that is smaller than the first distance.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
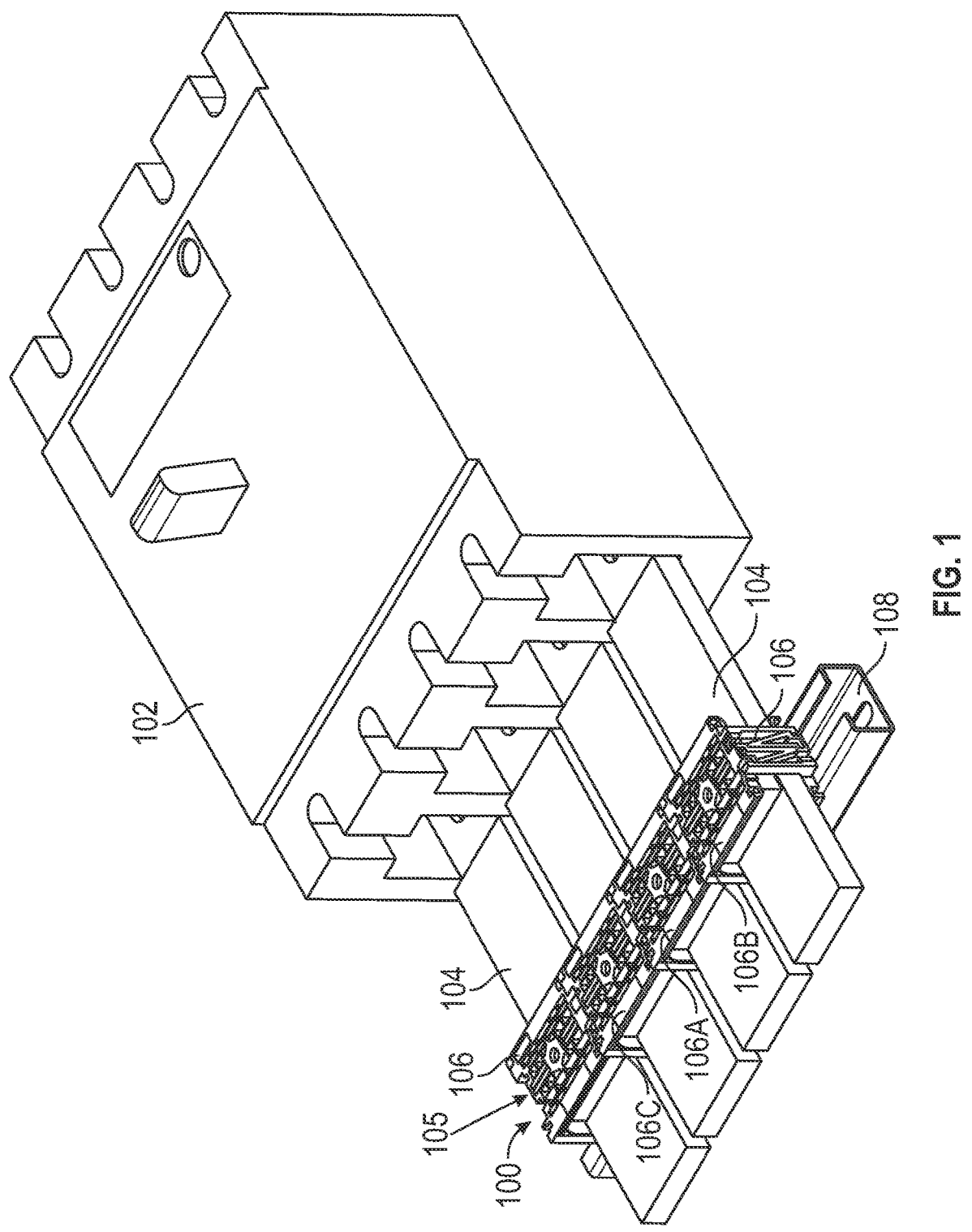
FIG. 1 is an isometric view of a bracing system according to an embodiment of the invention, the bracing system including conductor supports that support low voltage power conductors connected to a breaker.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to electrically link a high-to-low voltage transformer to a power distribution module or otherwise provide for transmission of low voltage electrical power between different electrical modules. During service, conductors for this purpose can be subject to significant mechanical forces, including due to electromagnetic forces from electrical surges through the conductors or during a short circuit. Accordingly, it may be useful to securely connect conductors to support structures (e.g., to building structures or within a cabinet or other enclosure) to ensure continued operational reliability.

Embodiments of the invention can be useful for this purpose, and others. For example, embodiments of the invention may include a bracing system for conductors that can be easily installed to secure conductors of a wide variety of sizes in a wide variety of spatial arrangements. Some embodiments can be used to secure multiple conductors with a predetermined close spacing, in close proximity to a surge protector or other electrical module, or in various other ways.

In particular, some examples can include a conductor support formed from one or more sets of modular support bodies. Sets of the support bodies can be snapped together around a conductor, other otherwise connected to each other, to secure the conductor therebetween. One or more of the sets can also be secured to building structure or into an enclosure in suitable (and adaptable) arrangements to anchor and support the conductor(s) relative to larger systems (e.g., with appropriate spacing and proximity relative to a circuit breaker, for a variety of conductor sizes). In some cases support bodies can be formed of a reversible design, in which two substantially identical support bodies or two support bodies with substantially identical engagement structures can be aligned with inverted relative orientations, to be connected together and thereby secure a conductor to a building support structure.

Figure 2:
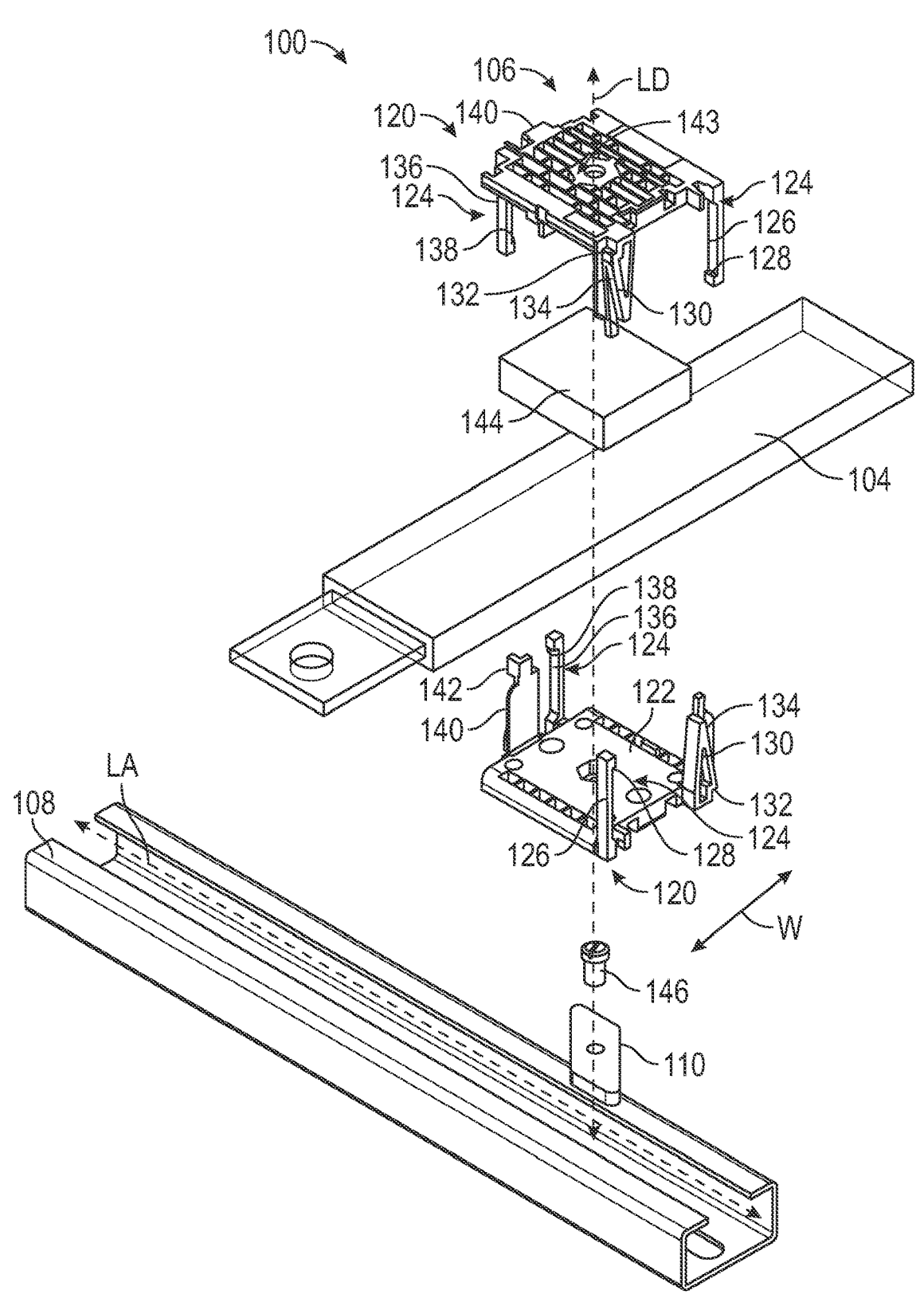
FIG. 2 is an exploded view of a conductor support of the bracing system of FIG. 1 according to an embodiment of the invention.

FIGS. 1 and 2 illustrate an example configuration of a bracing system 100 connected with a circuit breaker 102 according to some embodiments of the invention. In the illustrated example, the bracing system 100 is configured to receive conductors 104 attached to the circuit breaker 102. The conductors 104, for example, can be braided or other conductors with rectangular or oblong cross-sections and insulating sleeves, or conductors of various known configurations. The conductors 104 are received by respective conductor supports 106 that are mounted on the mounting profile 108 (e.g., a strut) and secured by a nut 110 (e.g., a strut nut for engagement with a standard form strut or other building structure) and corresponding screw.

In particular, FIG. 1 illustrates the conductor supports 106 of the bracing system 100 arrayed laterally along the mounting profile 108 to form a laterally extended support array 105 (i.e., to form an example expanded configuration of the bracing system 100). For example, the laterally extending support array can include a first conductor support 106A and a second conductor support 106B and a third conductor support 106C positioned directly adjacent to the first conductor support 106A, on opposing sides thereof. The laterally extending support array 105 extends transverse to the axial direction of the conductor (e.g., extends radially relative to a center axis of conductors that pass through the relevant support(s), and horizontally relative to gravity in the example shown).

In some examples, the conductors can be manufactured with copper, aluminum, or other raw materials used for conducting current. The conductors can be manufactured from wires, strands, laminates, or plain bar, in any shape. In some examples, the conductors may include insulated covers (e.g., rubber).

Implementation of embodiments in the illustrated configuration may be particularly advantageous in some cases, including to provide secure and easily installed arrangements for a desired conductor spacing and strong structural support relative to a circuit breaker. However, embodiments of the invention can be used in other settings. For example, different spatial arrangements of conductors can be secured relative to a variety of electrical devices or systems, and various types of building support structures, enclosures, or other support structures can be used other than those shown.

As further detailed below, the conductor supports 106 can be easily assembled onto the conductors 104 and secured to the mounting profile 108, to securely hold the conductors 104 in a desired orientation (e.g., with a desired spacing relative to the other conductors 104 and the circuit breaker 102, as shown). Generally, the conductor support 106 can be strong enough to prevent the conductors 104 from moving in the event of expected current surges, as well as being easy to install and uninstall and allowing for cooling air flow around the conductors 104. In some cases, the conductor support 106 can be configured to be easily installed within a confined area while providing a particular alignment. For example, the conductors support 106 can align conductors with uniform 4 mm to 5 mm lateral spacing between each other or otherwise (e.g., with smaller or larger lateral spacing), including as further discussed below.

In some cases, a conductor support can include a set of interlocking support bodies that can be snapped together (or otherwise secured) around a conductor. As shown in FIG. 2 in particular, an example clip body 120 of the bracing system 100 includes a base 122 and catches 124 that protrude from the base 122. As further discussed below, the catches 124 are generally arranged to provide a snap-fit engagement with corresponding catches on another (opposed) clip body 120. Thus, in different examples, the catches 124 can generally exhibit various arrangements of shoulders and flexible legs. In the example illustrated, two legs are included in each set of the catches 124 (e.g., on each lateral side of the clip body 120, as shown). However, other configurations are possible, including with more or fewer legs, differently arranged shoulders, etc.

Figure 3:
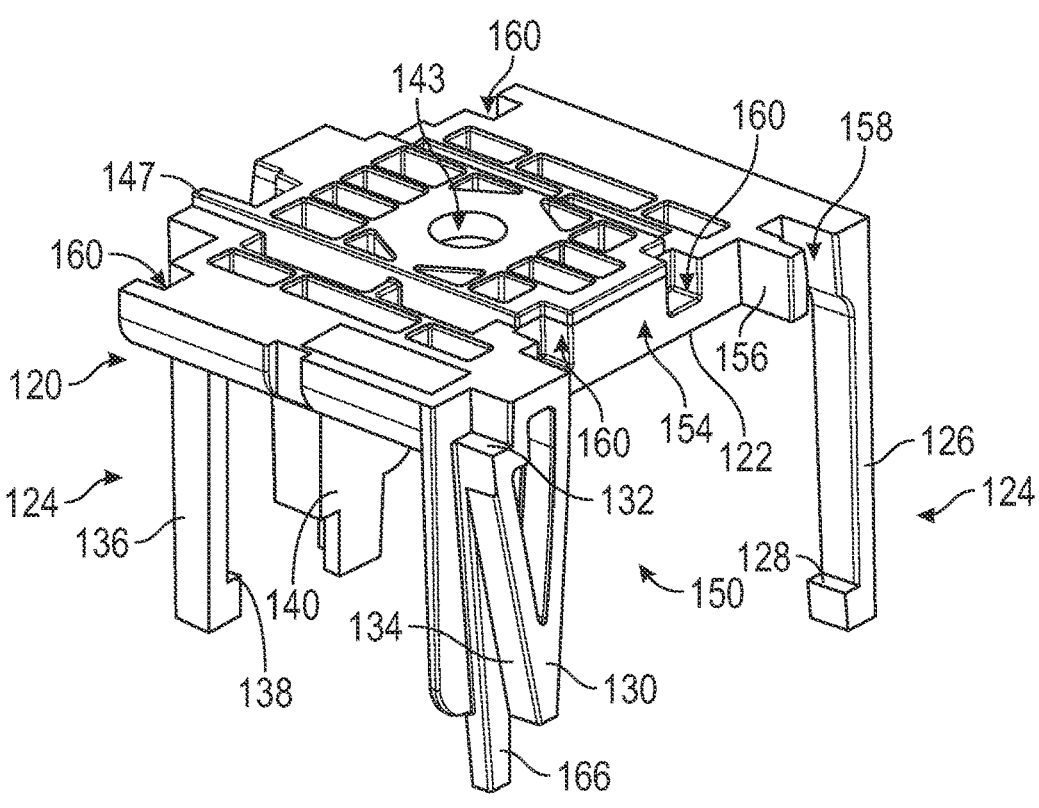
FIGS. 3 and 4 are top isometric views of opposing right and left sides of a clip body of the conductor support.

As shown in FIG. 3 in particular, the catches 124 on a first side of the clip body 120 can include a first cantilevered leg 126 with a distal shoulder 128, and a first deflector leg 130 with a proximal shoulder 132 (e.g., disposed adjacent to the base 122, as shown, relative to a length of the leg 130 along a longitudinal direction). To provide improved ease of operation, in combination with secure engagement, the first deflector leg 130 can be more rigid than the first cantilevered leg 126 relative to a common direction of action (e.g., along the conductor 104, as shown). Further, the deflector leg 130 can include a deflection surface 134 disposed obliquely (e.g., acutely, as shown) to a longitudinal axis LD that corresponds to a relative direction of movement to engage the clip body 120 into a secured arrangement (as further discussed below). Thus, in some examples, the second leg 130 of a first of the clip bodies 120 can act as a relatively rigid deflector leg, to cause a deflection of the first cantilevered leg 126 of a second of the clip bodies 120 during installation, and thereby ensure movement of the cantilevered leg 126 into aligned configuration that engages the shoulders 128, 132 and secures the conductor support 106 together. Other feature can also be included, including a laterally facing guide surface 166 (see also FIG. 7).

Figure 5:
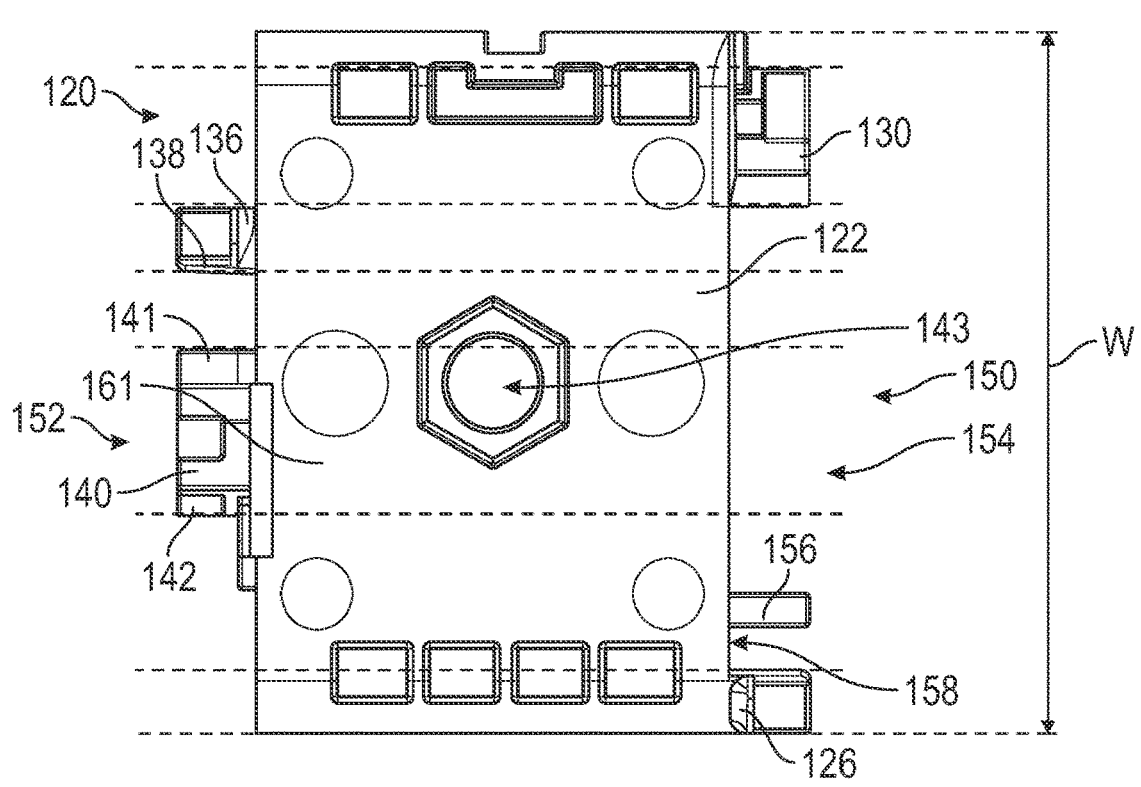
FIG. 5 is a top plan view of the clip body of the conductor support.
Figure 6:
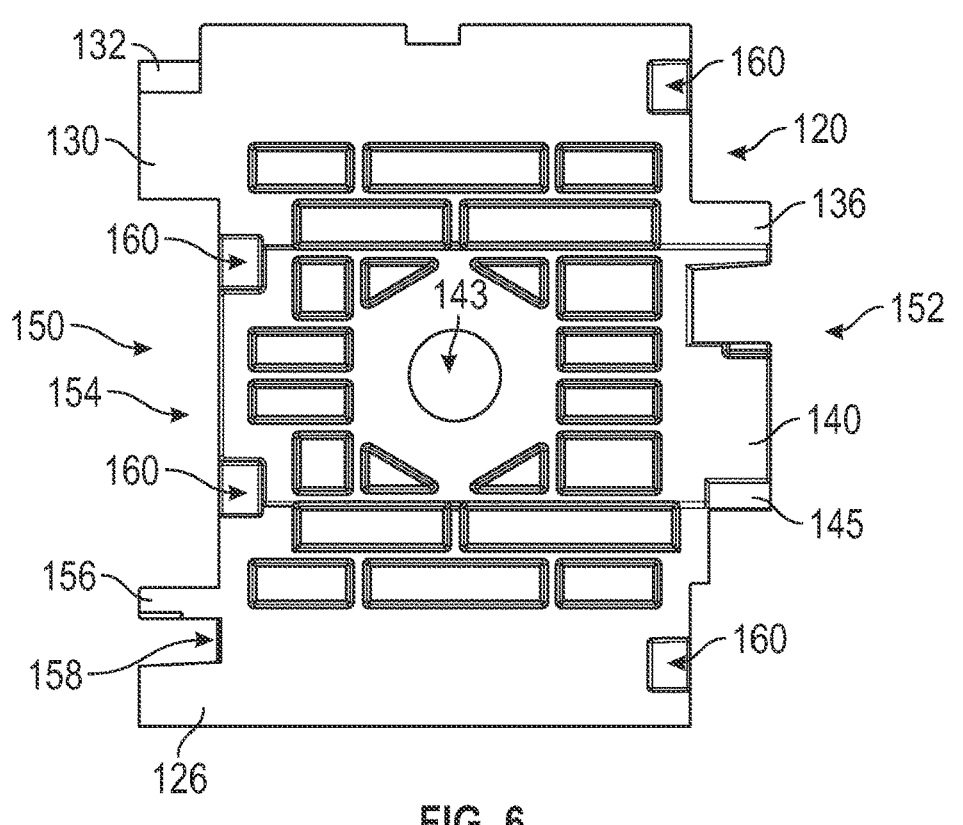
FIG. 6 is a bottom plan view of the clip body of the conductor support.

In the illustrated example, the legs 126, 130 extend adjacent to the corners of the base 122 of the clip body 120 relative to a width direction W (see FIG. 5). Correspondingly, when secured together with corresponding legs on another clip body (see, e.g., FIG. 9C), engaged structures can be formed adjacent to corners of the resulting support, relative to the width direction W (see FIG. 5). In other examples, however, other alignments are possible.

Figure 4:
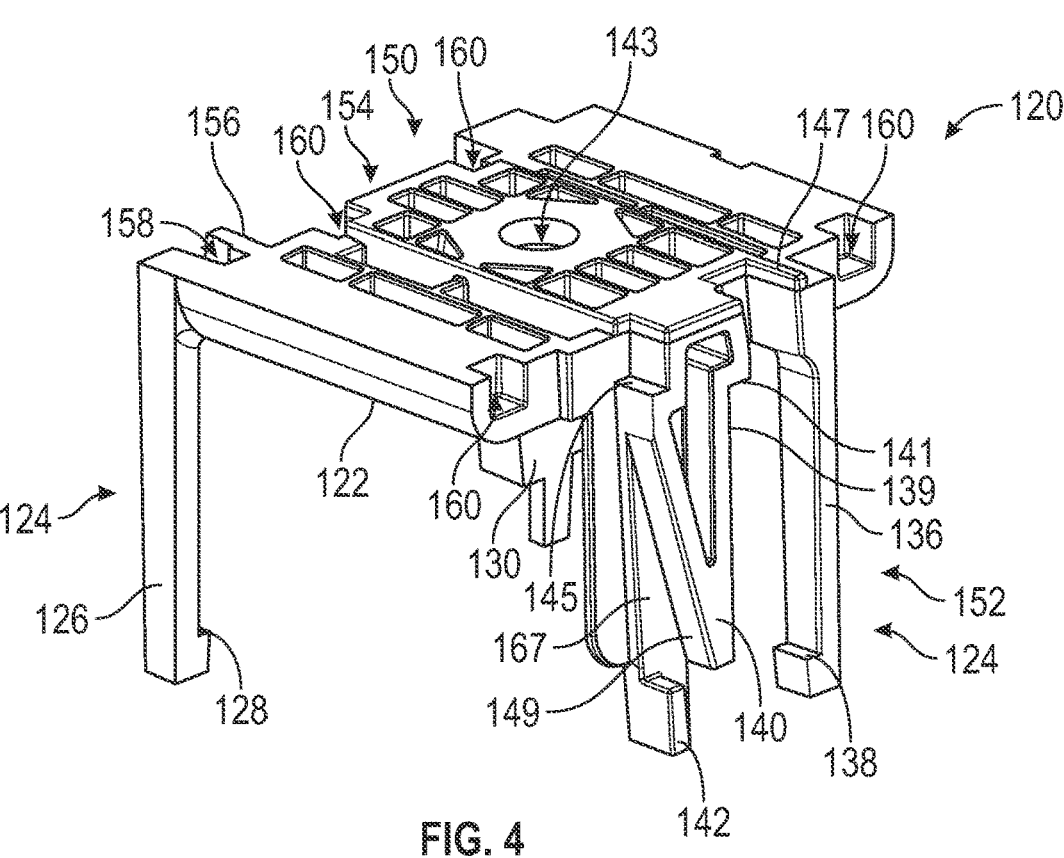

Generally, as also noted above, catches can be provided on multiple sides of a clip body. Thus, for example, sub-sets of the catches on different bodies can be inter-engaged to secure the bodies together. In some examples, catches along one side of a body can be similarly configured to catches along an opposing side of the body. For example, as shown in FIG. 4 in particular, the catches 124 along a laterally opposite side of the clip body 120 (relative to discussion of FIG. 3) can include another cantilevered leg 136 with a distal shoulder 138, and another deflector leg 140 with proximal shoulders 141, 145 that face in opposing directions. The leg 140 can further include a deflection surface 149 disposed obliquely to the longitudinal axis LD (e.g., acutely, as shown). Thus, in some examples, the leg 140 of a first of the clip bodies 120 can act as a relatively rigid deflector leg, and cause a resilient deflection of the leg 136 of a second of the clip bodies 120 during installation, to ensure an aligned engagement of the shoulders 138, 145 and thereby secure the conductor support 106 together. Further, the leg 140 in the illustrated example also includes a protruding end 142 extending from the tip of the leg 140, and a laterally facing guide surface 167 (see also FIG. 8).

In the illustrated example, the legs 136, 140 extend from a central portion of the side of base 122 of the clip body 120, spaced apart from the corners of the base 122 along the width direction W (see FIG. 5). For example, the legs 136, 140 can be non-adjacent to the corners relative to the width direction W (i.e., spaced apart from the corners by at least 25% of the width of the base 122). Correspondingly, when secured together with corresponding legs on another clip body (see, e.g., FIG. 9B), engaged structures can be formed toward the middle of the resulting support (relative to the width direction W). In some cases, this arrangement can be generally complementary to the corner engagement of legs 126, 130 as discussed above and further detailed below. In other examples, however, other alignments are possible.

In different examples, a base or other portion of a clip body 120 can be configured to be secured to other structures in various ways, including using known types of clips, threaded fasteners, or other similar devices. For example, as shown in FIGS. 3 and 4 in particular, the base 122 can also include a central aperture 143 configured to be aligned along the longitudinal axis LD. As further discussed below, in some examples, the central aperture 143 can be used to secure the conductor support 106 or the particular clip body 120 in various configurations, including relative to elongate support profiles, support plates of various shapes or sizes, or other clip bodies.

In some examples, as generally noted above, the conductor support 106 can be formed by securing two clip bodies (e.g., two substantially identical clip bodies) in engagement with each other. In the illustrated embodiment, for example, the clip body 120 is rotationally complementary to itself about a lateral axis LA that is perpendicular to the longitudinal axis LD. In other words, from a common starting orientation, one instance of the clip body 120 can be rotated relative to the lateral axis LA (or an axis parallel thereto) to be aligned to be secured to another instance of clip body 120 to provide the assembled conductor support 106. Thus, as shown in FIG. 2, the two clip bodies 120 can be moved to sandwich the conductor 104 from opposing sides relative to the longitudinal axis LD. In other examples, other clip bodies can also be similarly arranged for installation, including with differently configured catches or other features.

In some examples, supports as disclosed herein can be configured to accommodate a range of thickness of conductors. For example, to securely hold the conductor 104, a pad 144 (e.g., resilient pad) can be placed in between the conductor 104 and the clip bodies 120 along the base 122 to secure the conductor 104 between opposed sets of the catches 124. The pad 144 can be formed, for example, of natural or synthetic rubber or foam, or other suitable material known in the art, and can accordingly be configured to resiliently accommodate a range of thicknesses of conductors (e.g., to secure conductors thinner or thicker than the conductor 104 as shown). Further, the pad 144 can in some cases be removable or interchangeable, to further expand the range of conductor thicknesses that can be secured with the conductor support 106.

Before or after clip bodies of a support are assembled together, one or more of the clip bodies can be secured to a relevant support structure (e.g., a strut or associated building structure). As shown in FIG. 2, for example, the conductor support 106 can be removably secured onto the mounting profile 108 by a threaded fastener 146 that can be inserted through the central aperture 143 of one of the clip bodies 120 and engaged with the nut 110, with the nut 110 disposed within the mounting profile 108 (e.g., with the central aperture 143, the fastener 146, and the nut 110 along the longitudinal axis LD). In some examples, the conductor support 106 can be moved along the mounting profile 108 in the lateral direction before the fastener 146 is tightened into the nut 110, to adjust the conductor support 106 to a particular desired location for final installation. In this regard, for example, a longitudinal base protrusion 147 (see FIGS. 3 and 4) can nest into the channel of the mounting profile 108 to guide sliding movement of the conductor support 106 along the mounting profile 108.

In different examples, various other features can be provided to help to align or connect clip bodies for installation or provide support for a conductor or other component. For example, as shown in FIGS. 3 and 4 in particular, a laterally extending recess 154 is defined between the first cantilevered leg 126 and the first deflector leg 130 on a first side 150 of the clip body 120. Further, a protrusion 156 extends laterally from within the recess 154. The protrusion 156 and the cantilevered leg 126 thus defines a slot 158 therebetween. Additionally, on a second side 152 of the base 122, the legs 136, 140 generally define a protruding profile corresponding to (and laterally opposite from) the recess 154. Further, in the illustrated example, the base 122 also includes additional recesses 160 (e.g., smaller recesses) within the recess 154, and along the second side 152 adjacent the corners of the base 122.

As shown in FIG. 5 with dashed lines, the legs 136, 140 do not overlap with the legs 126, 130 (and the protrusion 156) relative to the width direction W of the clip body 120. Accordingly, as further discussed below, two of the clip bodies 120 can be easily connected together to form the conductor support 106. Other configurations are possible in other examples, however.

Also referring to FIG. 5, a first surface 161 of the base 122 that extends between the various legs 126, 130, 136, 140 can be configured to support (e.g., contact) a relevant conductor. Correspondingly, for example, ends of the first surface 161 can be rounded (e.g., radiused) on opposing ends of the base 122 in the width direction W. In some cases, this configuration can help to provide easier installation of a conductor while also protecting the conductor from abrasion or other damage. In other examples, however, other configurations are possible.

As noted above, in the illustrated example, the clip bodies 120 can be oriented in reversed relative orientations to be secured together into the conductor support 106. For example, the clip bodies 120 can be oriented with a rotational offset of 180° relative to each other, with respect to rotation about a direction corresponding to an axis of a conductor to be secured by the clip bodies 120.

Correspondingly, in some examples, a conductor support can include a first clip body 120A (e.g., upper clip body) and a second clip body 120B (e.g., lower clip body) which are substantially identical instances of the clip body 120 illustrated in FIGS. 1-8. Correspondingly, various features are discussed below for the clip bodies 120A, 120B with "A" or "B" indicating corresponding instances of various numbered features discussed above for the clip body 120 (e.g., cantilevered legs 126A, 126B, etc.). Other examples, however, may exhibit different configurations (e.g., with non-identical clip bodies or differently configured legs).

Figures 9A, 9B:
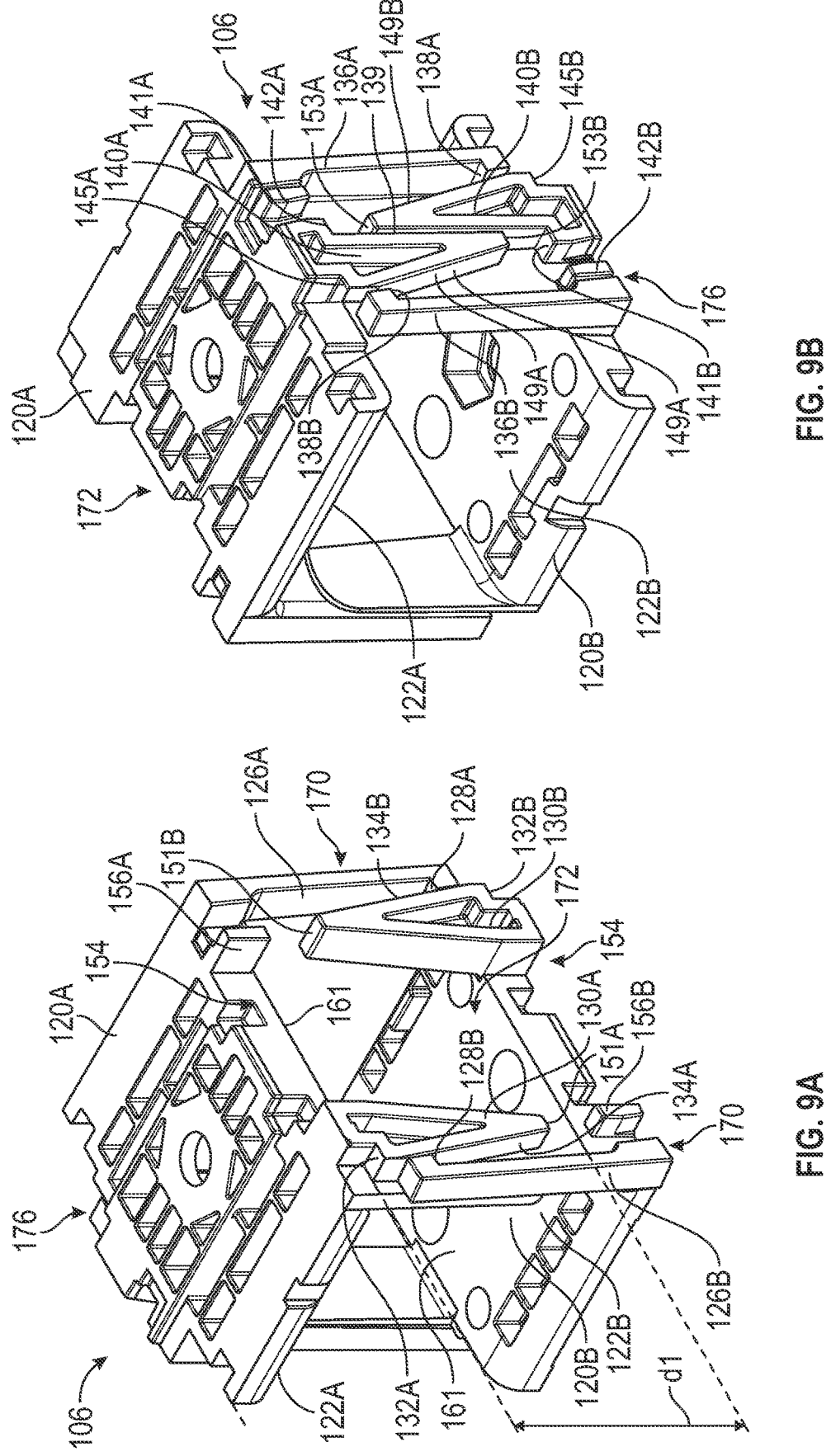
FIGS. 9A and 9B are isometric views of opposing sides of two clip bodies prior to assembly for the conductor support of FIG. 1.

FIGS. 9A and 9B illustrate an example staging configuration of the conductor support 106, with the clip bodies 120A, 120B being spaced from each other by a first distance d1 (measured between the first surfaces 161 of the opposing bases 122A, 122B-see also FIG. 5). For example, the clip bodies 120A, 120B can be thus arranged prior to being securely coupled to each other (e.g., with a conductor therebetween (conductor not shown in FIGS. 9A and 9B)).

Figure 7:
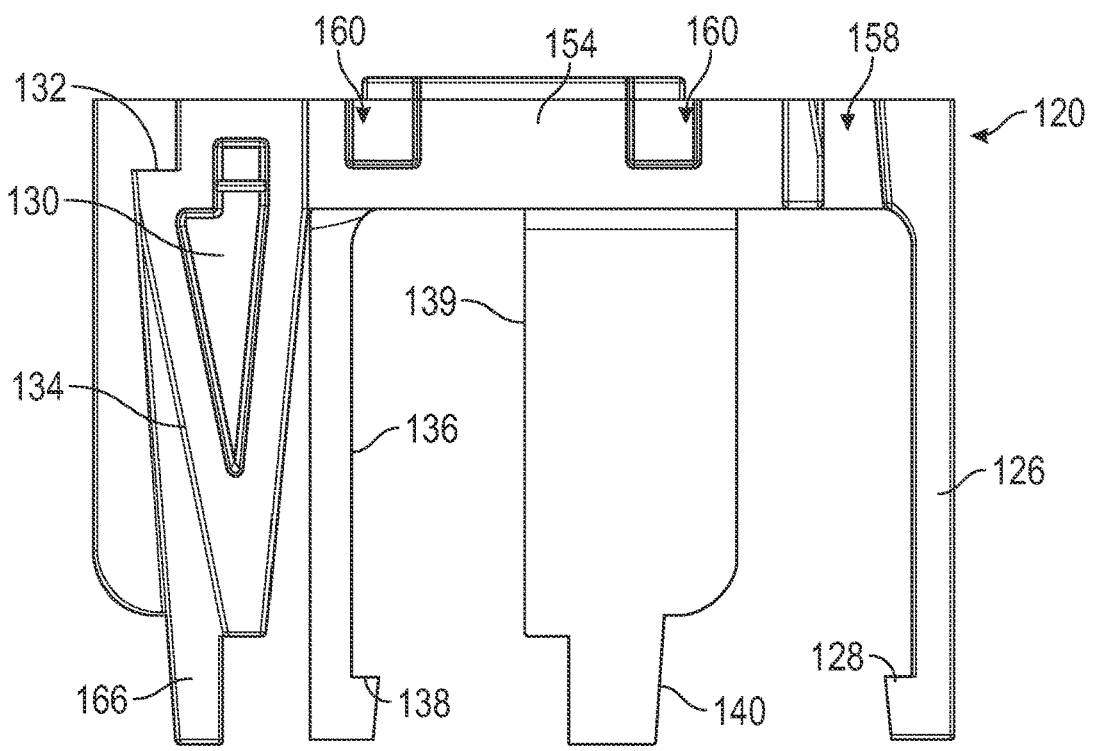
FIG. 7 is a right-side elevational view of the clip body of the conductor support of FIG. 3.
Figure 8:
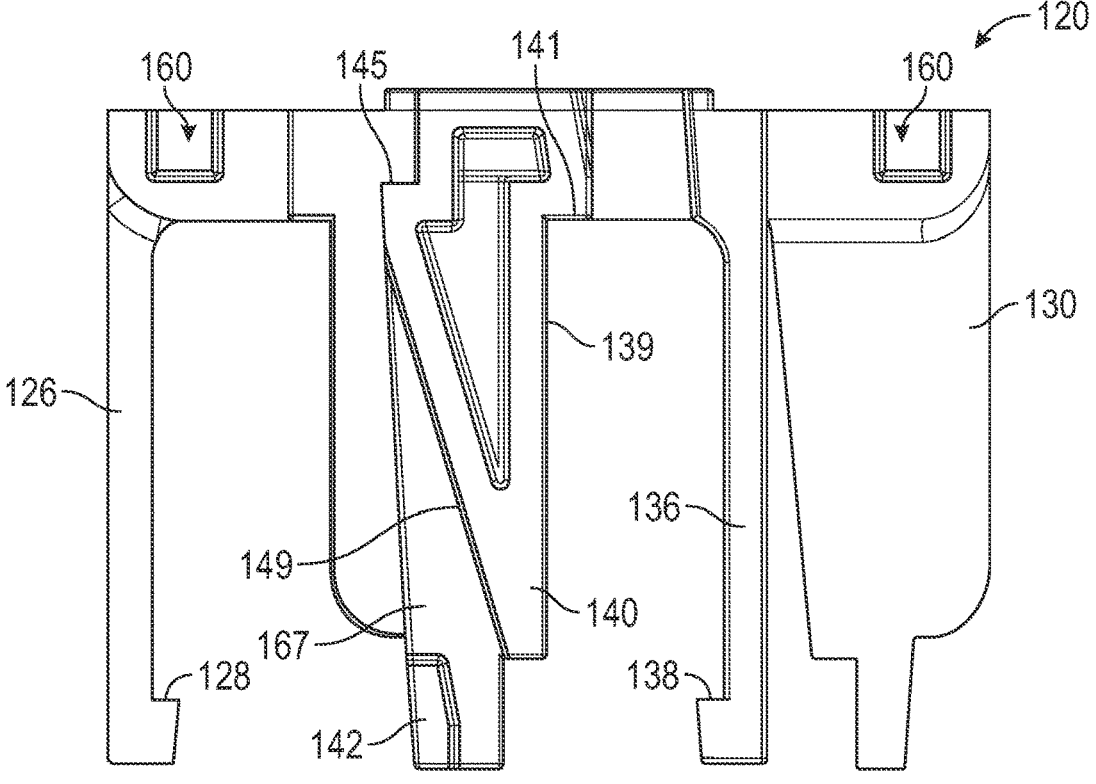
FIG. 8 is a left-side elevational view of the clip body of the conductor support of FIG. 3.

In particular, FIG. 9A illustrates the cantilevered legs 126A, 126B of the clip bodies 120 being in contact with deflector legs 130A, 130B of the clip bodies 120. Correspondingly, for example, protrusions 156A, 156B of the two clip bodies 120A, 120B can be spaced apart from distal surfaces 151A, 151B of the deflector legs 130A, 130B. As shown, distal portions of the cantilevered legs 126A, 126B (e.g., adjacent to the distal shoulders 128A, 128B) are in contact with the deflection surfaces 134A, 134B of the deflector legs 130A, 130B. The deflector legs 130A, 130B are thus aligned to deflect the cantilevered legs 126A, 126B as the cantilevered legs 126A, 126B are moved along the deflection surfaces 134A, 134B (e.g., to cause the cantilevered legs 126A, 126B to angularly deviate from a rest configuration, including a linear rest configuration as shown in FIGS. 7 and 8).

In this regard, generally, as movement of the clip bodies 120A, 120B toward each other moves the cantilevered legs 126A, 126B closer to the proximal shoulders 132B, 132A of the deflector legs 130B, 130A, the deflection surfaces 134B, 134A can deflect (e.g., bend) the cantilevered legs 126A, 126B outwardly away from the deflection surfaces 134B, 134A. This deflection, in combination with the movement of the clip bodies 120A, 120B toward each other can accordingly move the shoulders 128A, 128B of the cantilevered legs 126A, 126B into alignment to engage the shoulders 132B, 132A of the deflector legs 130B, 130A.

Similarly, FIG. 9B illustrates cantilevered legs 136A, 136B and deflector legs 140A, 140B on a laterally opposite side of the conductor support 106. In particular, distal portions of the cantilevered legs 136A, 136B (e.g., adjacent to the distal shoulders 138A, 138B) are in contact with the deflection surfaces 149A, 149B of the deflector legs 130A, 130B. Correspondingly, for example, a proximal shoulder 141A of the deflector leg 140A is spaced apart from a distal surface 153B of the deflector leg 140B, and a proximal shoulder 141B of the deflector leg 140B is spaced part from a distal surface 153A of the deflector leg 140A. The deflector legs 140A, 140B are thus aligned to deflect the cantilevered legs 136B, 136A as the cantilevered legs 136B, 136A are moved along the deflection surfaces 149A, 149B (e.g., to cause the cantilevered legs 136B, 136A to angularly deviate from a rest configuration, including a linear rest configuration shown in FIGS. 7 and 8).

In this regard, generally, as movement of the clip bodies 120A, 120B toward each other moves the cantilevered legs 136A, 136B closer to the proximal shoulders 145B, 145A of the deflector legs 140A, 140B, the deflection surfaces 149A, 149B can deflect (e.g., bend) the cantilevered legs 136A, 136B outwardly away from the deflection surfaces 149A, 149B. This deflection, in combination with the movement of the clip bodies 120A, 120B toward each other can accordingly move the shoulders 138A, 138B of the cantilevered legs 136A, 136B into alignment to engage the shoulders 145B, 145A.

Figures 9C, 9D:
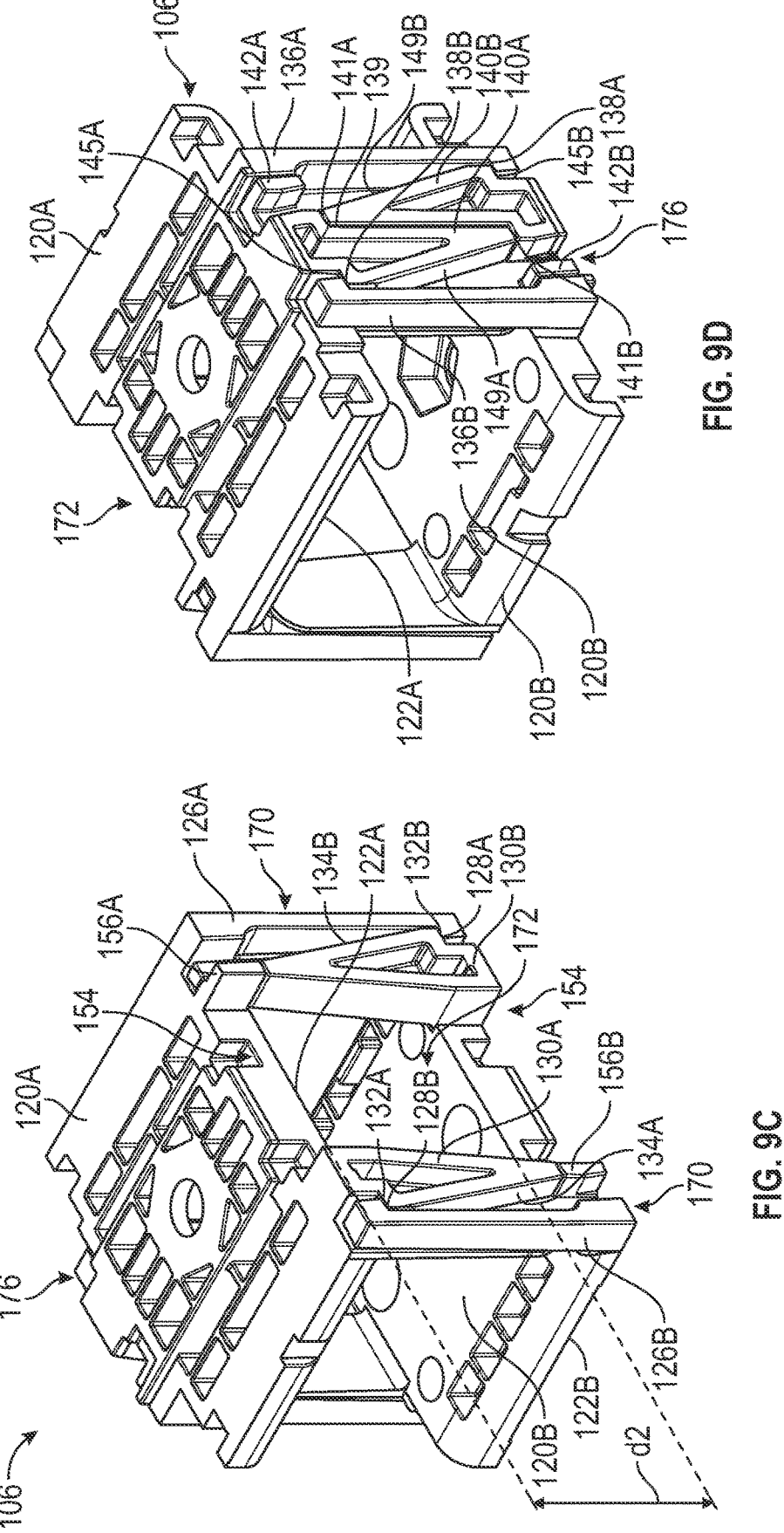
FIGS. 9C and 9D are isometric views of opposing sides of two clip bodies assembled for the conductor support of FIG. 1.

FIGS. 9C and 9D illustrate an example configuration of two of the clip bodies 120 releasably engaged in a secured configuration. In particular, FIG. 9C illustrates the engagement of the cantilevered legs 126A, 126B of the clip bodies 120A, 120B with the first deflector legs 130B, 130A of the clip bodies 120B, 120A. As shown, the distal shoulders 128A, 128B of the legs 126A, 126B can be removably engaged with the proximal shoulders 132B, 132A of the deflector legs 130B, 130A. Furthermore, the protrusions 156A, 156B of the two clip bodies 120A, 120B abut with the deflector legs 130B, 130A (e.g., at distal ends thereof). In particular, in the illustrated secured configuration, the first clip body 120A and the second clip body are separated by a second distance d2 that is smaller than the first distance d1 depicted in FIG. 9A. Thus, for example, a user can engage the clip bodies 120A, 120B for installation by moving the clip bodies 120A, 120B toward each other in the longitudinal direction, as guided in some cases by initial contact of the legs 126A, 126B with the respective guide surface 166 (see FIG. 3). With sufficient such movement, the deflection surfaces 134A, 134B can accordingly appropriately deflect the legs 126B, 126A to allow engagement of the shoulders 128A/B, 132B/A. Further, contact between the protrusions 156A, 156B and the deflector legs 130B, 130A can provide a stop against over-compression or over-insertion in the longitudinal direction during installation.

Similarly, FIG. 9D illustrates the engagement of the cantilevered legs 136A, 136B and the deflector legs 140B, 140A on a laterally opposite side of the conductor support 106. In particular, the distal shoulders 138A, 138B of the legs 136A, 136B can be removably engaged with the proximal shoulders 145B, 145A of the deflector legs 140B, 140A. Furthermore, the shoulders 141A, 141B of the deflector legs 140A, 140B can abut with the opposing legs 140B, 140A. Thus, for example, as similarly described above, a user can engage the clip bodies 120A, 120B for installation by moving the clip bodies 120A, 120B toward each other in the longitudinal direction, as guided in some cases by initial contact between the legs 136A, 136B and the respective guide surface 167 (see FIG. 4). With sufficient such movement, the guide surfaces 149A, 149B can accordingly appropriately deflect the legs 136B, 136A to allow engagement of the shoulders 138, 145. Further, contact between the legs 140B, 140A at the shoulders 141A, 141B can provide a stop against over-compression or over-insertion in the longitudinal direction during installation. Moreover, in the illustrated example, the protrusions 142A, 142B can also be engaged with the legs 136B, 136A to help to guide installation and secure the final assembly. Further, additional support and guidance for alignment can be provided by contact between surfaces 139 of the legs 140A, 140B that extend longitudinally between the shoulders 141A, 141B, opposite the guide surfaces 149A, 149B.

In the illustrated example, one or more of the shoulders 128, 132, 138, 145 can extend an acute angle (i.e., less than 90 degrees) to engage with a counterpart shoulder during service. In the illustrated embodiment of FIGS. 1-9B, the shoulders 128, 132, 138, 145 are designed at an engagement angle of 87 degrees to provide improved clamping force and tendency to remain engaged once installed. In particular, an acute angle of the shoulders 128, 132, 138, 145 can help to prevent the engagement between the relevant legs from slipping or disengaging. In some examples, the clamping force can be further increased by the resilient pad between the first and second clip bodies 120A, 120B (e.g., in combination with acutely angled shoulders).

In some examples, the conductor supports 106 can be coupled in different orientations to form a bracing system 100 (e.g., by utilizing different mounting features). For example, the conductor supports 106 can be stacked on top of each other to support a vertical array of conductors, or can be adjoined alongside of each other to support a lateral array of conductors.

Figure 10:
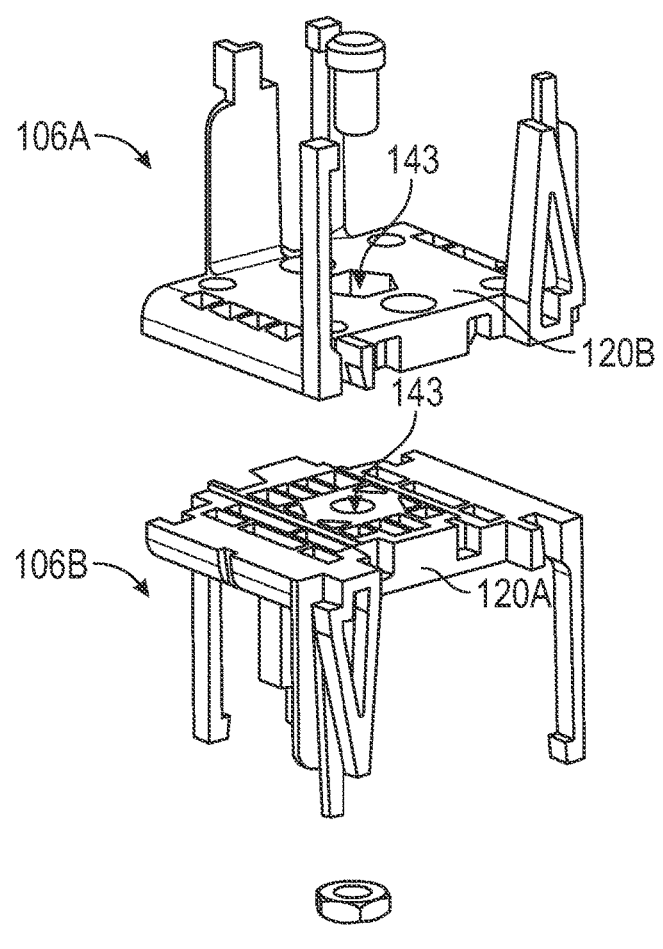
FIG. 10 is an exploded view of clip bodies for two conductor supports, arranged in a stacked configuration.

In this regard, for example, FIG. 10 illustrates a first expanded configuration of the clip bodies 120A, 120B. In particular, the first expanded configuration can be a stacked configuration for the clip bodies 120A, 120B, with the lower clip body 120B of a first conductor support 106A coupled to the upper clip body 120A of a second conductor support 106B by suitable fasteners or other devices. For example, as shown, a bolt can be inserted through the central aperture 143 and secured by a nut, although other configurations are possible (e.g., other integrally formed catch structures). Of note, in some examples, a hexagonal or other profile the at the central aperture(s) 143 can help to prevent a fastener (e.g., a nut, as shown) from rotating relative to the respective clip body 120, and can thereby provide for relatively easy assembly of the clip bodies 120 into a stacked configuration. After the clip bodies 120A, 120B are secured together, other clip bodies (not shown in FIG. 10) can then be secured to the clip bodies 120A, 120B to provide a stacked arrangement for the conductor supports 106A, 106B to secure a vertical array of conductors.

Figure 11:
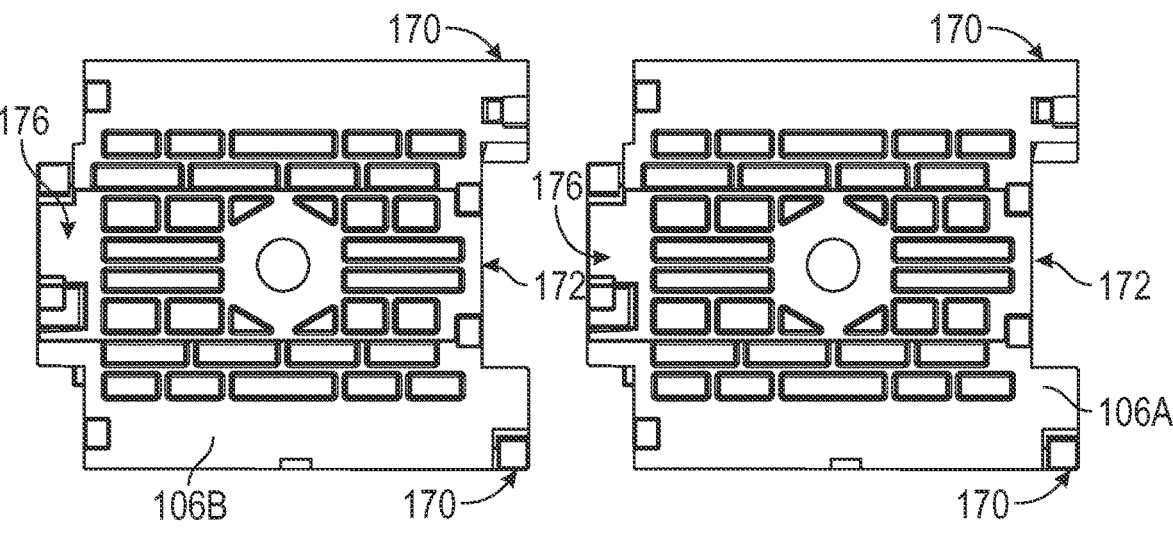
FIG. 11 is a top plan view of clip bodies for two conductor supports, arranged to be assembled in a side-by-side configuration.

As another example, FIG. 11 illustrates a second expanded configuration of the clip bodies 120A, 120B. The second expanded configuration can be a lateral array (e.g., laterally extending array) of the conductor supports 106A, 106B. As mentioned above, the conductor support 106 can be formed by two clip bodies 120A, 120B that are secured to each other with the legs 126, 130, 136, 140. As also shown in FIGS. 9A and 9B, the legs 126, 130 can collectively define laterally protruding structures 170 on opposing sides of the recesses 154. Accordingly, the assembled conductor support 106 can define a laterally recessed structure 172 between the protruding structures 170. Similarly, the legs 136, 140 can collectively form a laterally protruding structure 176 that is disposed laterally opposite of the recessed structure 172.

With appropriate configuration, the protruding structure 176 of the first conductor support 106A can thus be received (e.g., nested) within the recessed structure 172 of the second conductor support 106B (or vice versa) to align or secure the conductor supports 106A, 106B in a laterally extended array. For example, the conductor supports 106A, 106B can be moved laterally into contact with each other from the orientation shown in FIG. 11, and then secured to appropriate other structures. In some cases, press-fit or other secure engagement between the protruding and recessed structures 176, 172 (or elsewhere on the conductor supports 106A, 106B) can be provided.

Figures 12A, 12B:
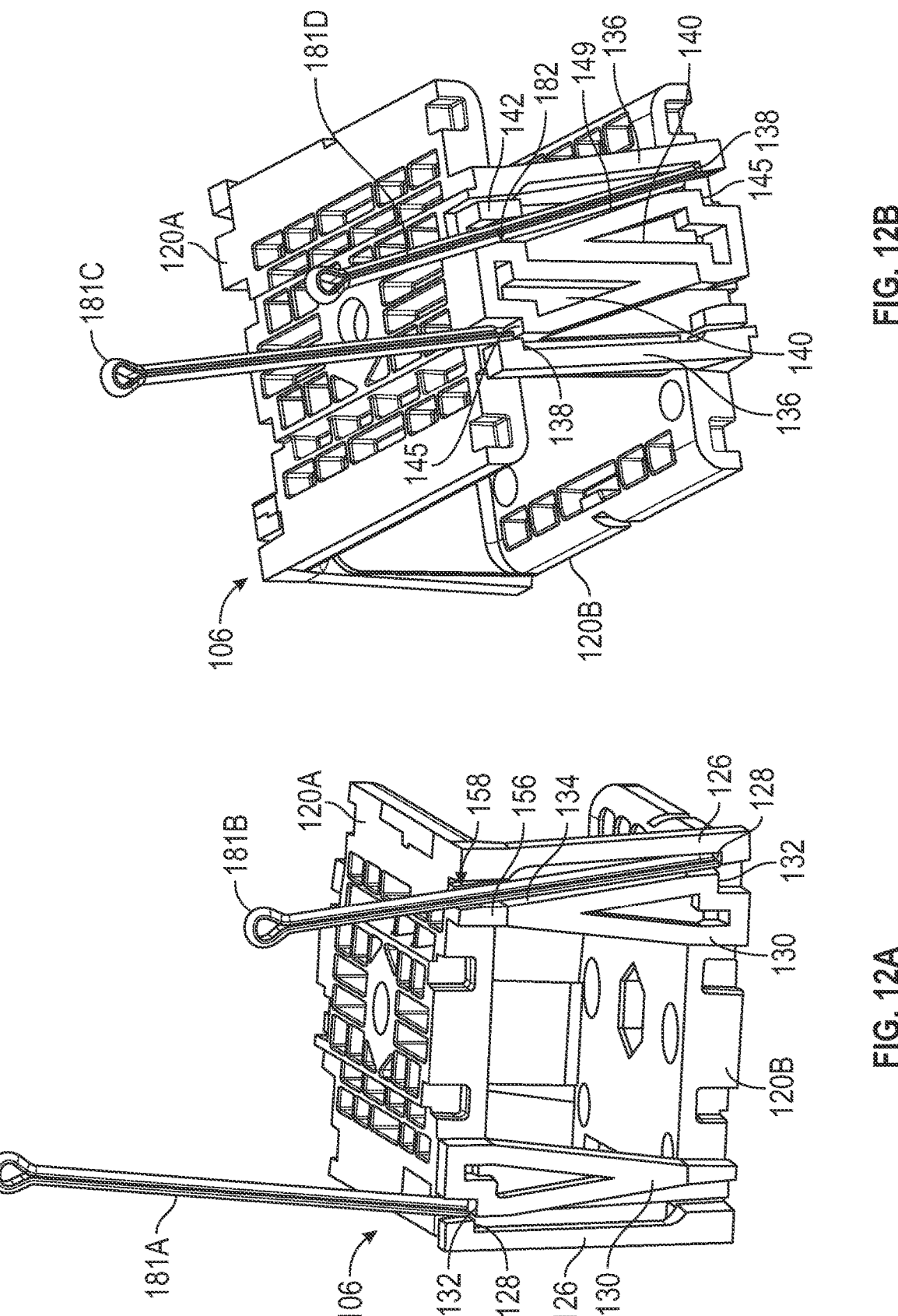
FIGS. 12A and 12B are perspective views of an example method of dissembling a conductor support to release a conductor.

In some examples, support bodies can be configured to be disassembled from each other relatively easily. For example, FIGS. 12A and 12B illustrate a method of dissembling the upper and lower clip bodies 120A, 120B of the conductor support 106. In particular, the legs 126, 136 can be disengaged from the legs 130, 140 by inserting a pin or a hand tool (e.g., screwdriver) to separate the connection between the distal shoulder 128 of the cantilevered leg 126, 136 and the connection between the proximal shoulder 132 of the deflector leg 130, 140.

Referring to FIG. 12A, a first pin 181A (or other tool) can be inserted between the deflector leg 130 and the cantilevered leg 126 near the engagement of the shoulders 128, 132. As inserted, the first pin 181A can thus lever the distal shoulder 128 apart from the shoulder 132 to release the cantilevered leg 126 from the deflector leg 130. Similarly, a second pin 181B (or another tool) can be inserted through the slot 158 defined between the protrusion 156 and the cantilevered leg 126 and will be stopped by touching the distal shoulder 128. The engagement with the distal shoulder 128 can, for example, allow maximum bending of the cantilevered leg 126 without plastic deformation or breakage. The second pin 181B can thus extend along the guide surface 134 of the deflector leg 130 to lever the distal shoulder 128 away from the shoulder 132 and release the cantilevered leg 126 from the deflector leg 130. Accordingly, for example, with both of the pins 181A, 181B inserted, both of the cantilevered legs 126 can be released via access from the top of the conductor support 106 (e.g., even if close lateral spacing in an array of multiple supports or other factors limit access from a lateral side). Further, the orientation of either of the pins 181A, 181B can be reversed, as needed, to similarly release the legs 126 from the bottom of the conductor support 106.

In some examples, legs on an opposing side of a support can be similarly released. For example, referring to FIG. 12B, a third pin 181C (or another tool) can be inserted between the deflector leg 140 and the leg 136, near the engaged shoulders 138, 145, to release the shoulders 138, 145 from engagement with each other. Similarly, a fourth pin 181D (or another tool) can be inserted through an opening 182 between the guide surface 134 and the protruding end 142 of the deflector leg 140. The fourth pin 181D can thus, for example, extend along the deflection surface 149 of the deflector leg 140 to lever the shoulder 138 of the leg 136 away from the shoulder 145 of the deflector leg 140. Thus, as similarly discussed relative to FIG. 12A, both of the legs 136 can be released via access from the top or the bottom of the conductor support 106.

Figures 13A, 13B, 13C, 13D, 13E:
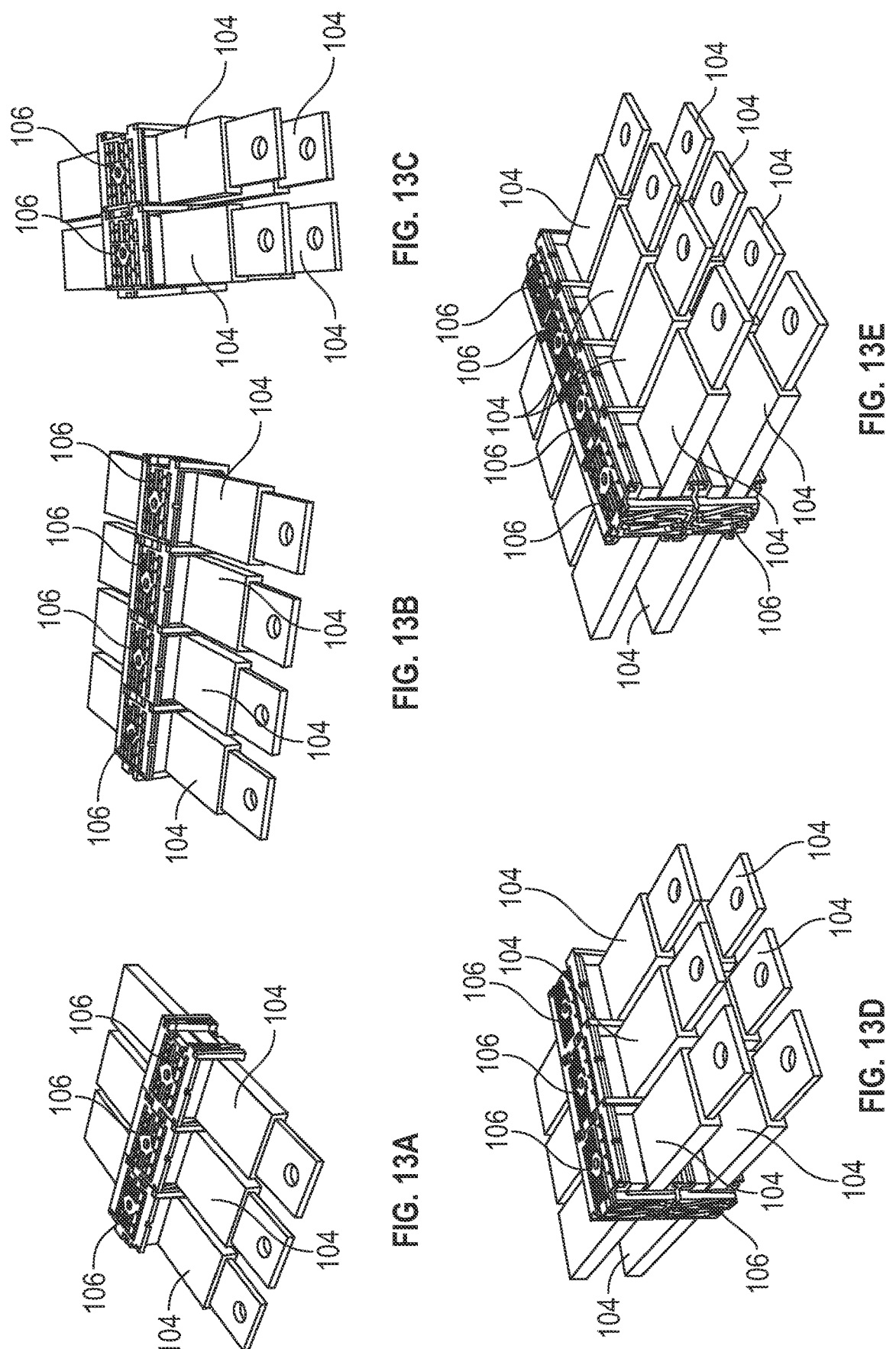
FIGS. 13A-E are perspective views of different configurations of conductor supports to form a bracing system.

As described above, multiple instances of the conductor supports 106 can be ganged together in expanded configurations to support a plurality of conductors 104. Referring to FIGS. 13A-13E, bracing systems with different example expanded configurations of the conductor supports 106 are shown. In particular, FIGS. 13A and 13B illustrate another expanded configuration of lateral arranged conductor supports 106 in a laterally extending support array. FIGS. 13C through 13E illustrate further expanded configurations, in particular with combinations of stacked expanded configurations (e.g., as also discussed relative to FIG. 10) and the laterally extended expanded configuration (e.g., as discussed relative to FIGS. 1 and 11). In some configurations, a stacked arrangement may include more than two stacked conductors or supports, or may not also include an extended lateral array (see, e.g., FIG. 10). Similarly, a laterally extended configuration may or may not include stacked conductors or supports (see, e.g., FIG. 1). Thus, the conductor supports 106 can be adaptably configured to provide compact and secure alignment of conductors 104 relative to many different electrical devices (e.g., a circuit breaker, a surge protection device, etc.).

Figure 14C:
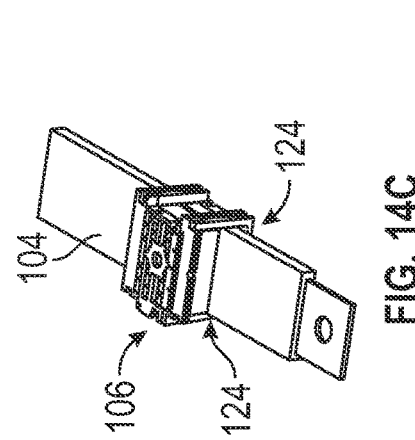
FIGS. 14A-F are perspective views of different examples of conductor supports.
Figure 14F:
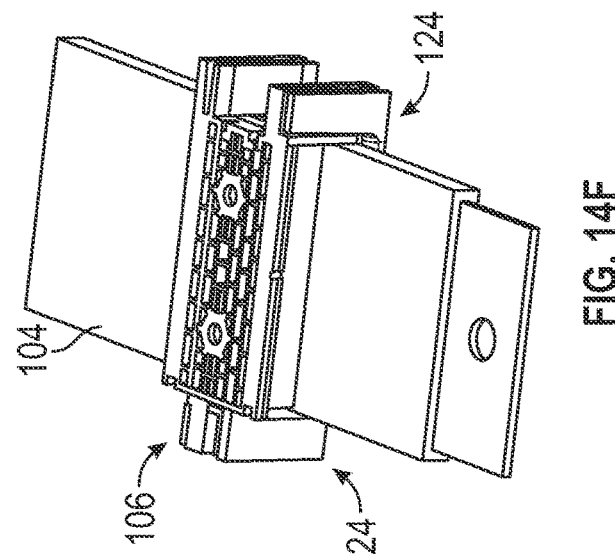
Figure 14B:
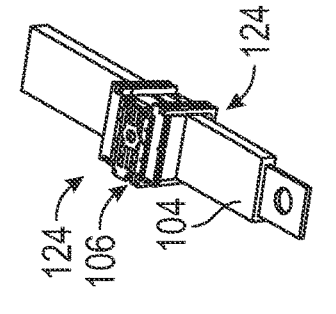
Figure 14E:
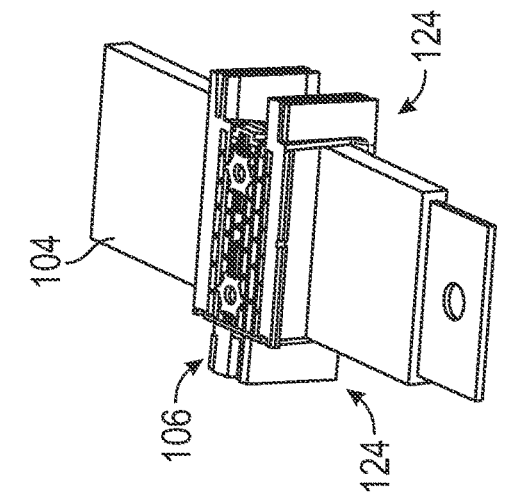
Figure 14E:
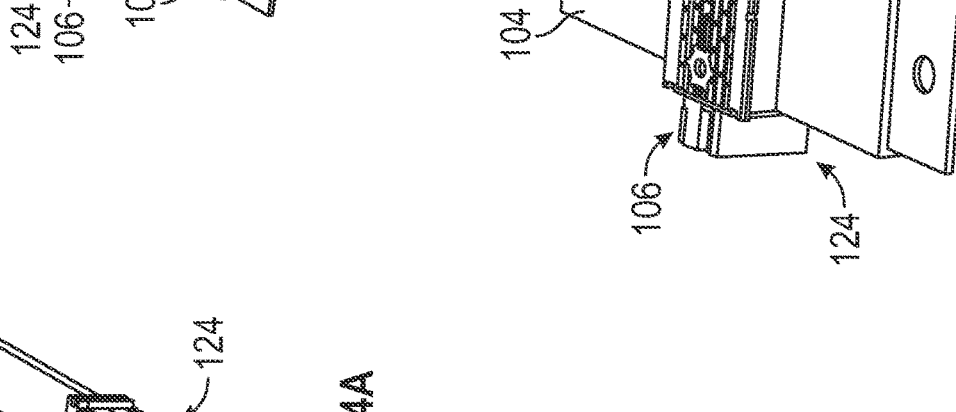
Figure 14A:
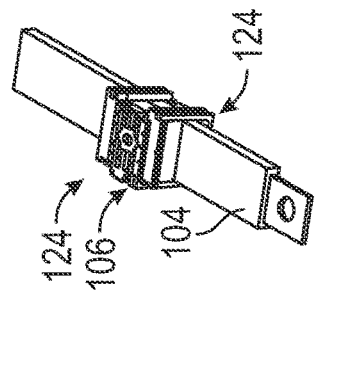
Figure 14D:
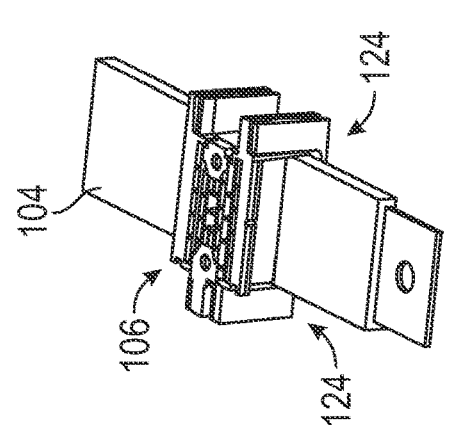

In different examples, differently dimensioned supports are also possible, including as can accommodate different sizes or shapes of conductors. Referring to FIGS. 14A-14F, for example, different lateral widths can be provided for the conductor support 106 to accommodate different conductor sizes. Correspondingly, in some examples, the lateral width of various legs can also be varied (e.g., while maintaining otherwise generally similar profiles and functionality as illustrated in FIGS. 3 and 4). For example, as shown in FIGS. 14D through 14F, the catches 124 in some examples can exhibit relatively large lateral widths (e.g., to provide a more secure, resilient engagement between the clip bodies of the various supports 106).

Figure 15:
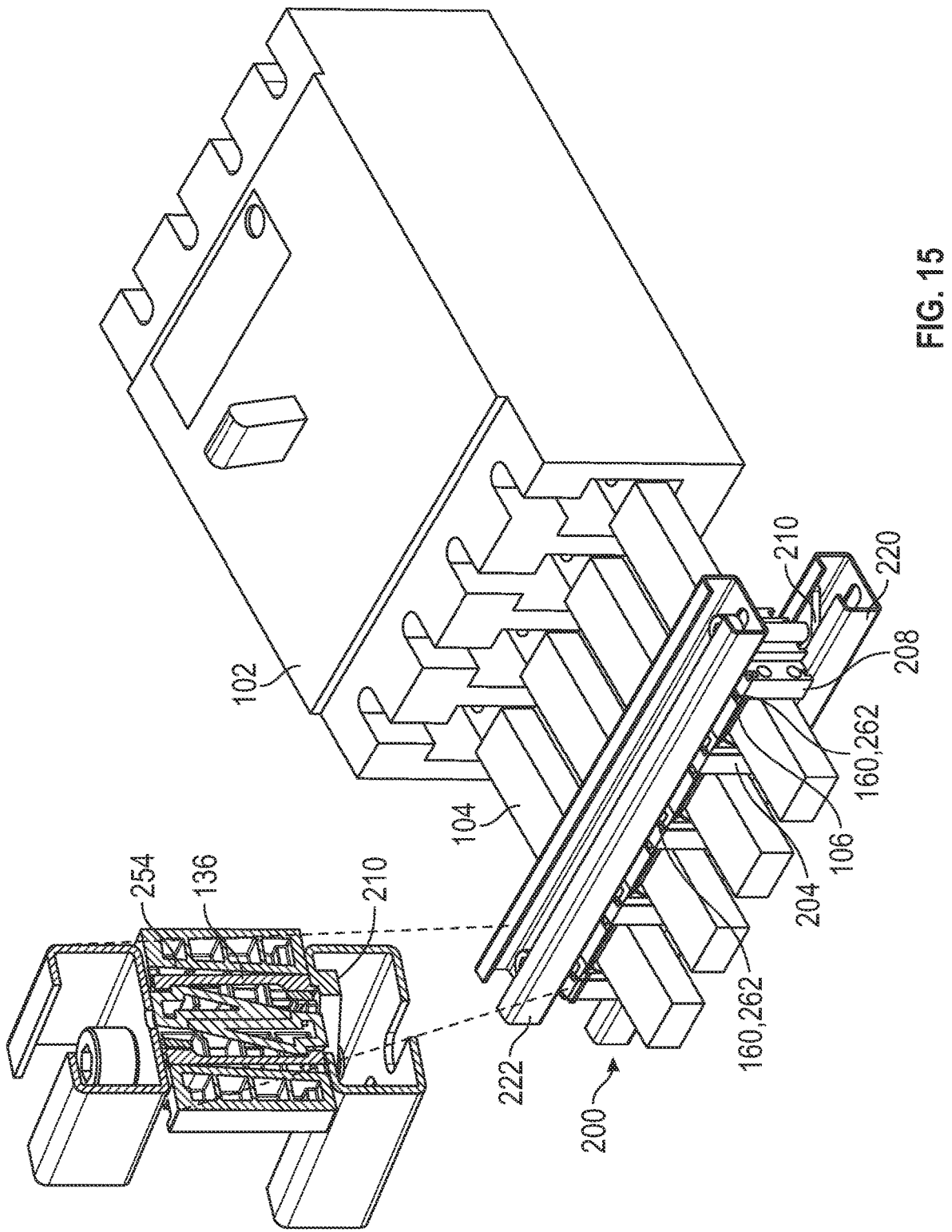
FIG. 15 is an isometric view of a bracing system according to another embodiment of the invention including a plurality of adapters, with a sectional detail view of part of the bracing system.

In some embodiments, adapters or other components can be used to provide particular spacing or particularly secure installation for a conductor supports. In this regard, FIG. 15 illustrates another example configuration of a bracing system 200 connected with the circuit breaker 102 according to some embodiments of the invention. The bracing system 200 includes similar components as shown in FIG. 1. For example, the bracing system 200 includes various conductor supports 106 arranged laterally to secure the conductors 104 (e.g., braided or other conductors with oblong cross-sections) relative to the circuit breaker 102. Correspondingly, discussion with regard to the bracing system 100 of FIG. 1 also generally applies to the bracing system 200 of FIG. 15.

In some regards, however, the bracing system 200 differs from other examples discussed above. For example, the conductor supports 106 of FIG. 15 are arranged with intermediate adapters 204 disposed between the conductor supports 106 and end adapters 208 disposed at opposed lateral ends of the bracing system 200. In the example shown, the adapters 204, 208 are substantially identical to each other and can thus be used interchangeably. In other examples, however, other configurations are possible (e.g., with different end and intermediate adapters, or with other adapter arrangements for appropriate spacing or reinforcement, including as further discussed below).

To provide a securely maintained lateral spacing and appropriate vertical clamping force, an upper mounting profile 222 (e.g., a strut) is placed on top of the conductor supports 106 and the adapters 204, 208, and then secured via strut nuts 210 to a lower profile 220. Assisted by the adapters 204, 208, this arrangement accordingly clamps the conductor supports 106 between the profiles 220, 222 to ensure a firm connection and appropriate spacing for the conductors 104. Further, through the use of adapters of various sizes (or no adapters), particular lateral spacing can be provided for particular installations (e.g., uniform spacing, as shown). In some examples, as further discussed below, adapters can themselves also provide particular features to assist in securing a bracing system to building structures or enclosures. Further, in some examples, use of the intermediate adapters 204 can provide better heat transfer (e.g., for convective cooling of conductors).

Figure 16:
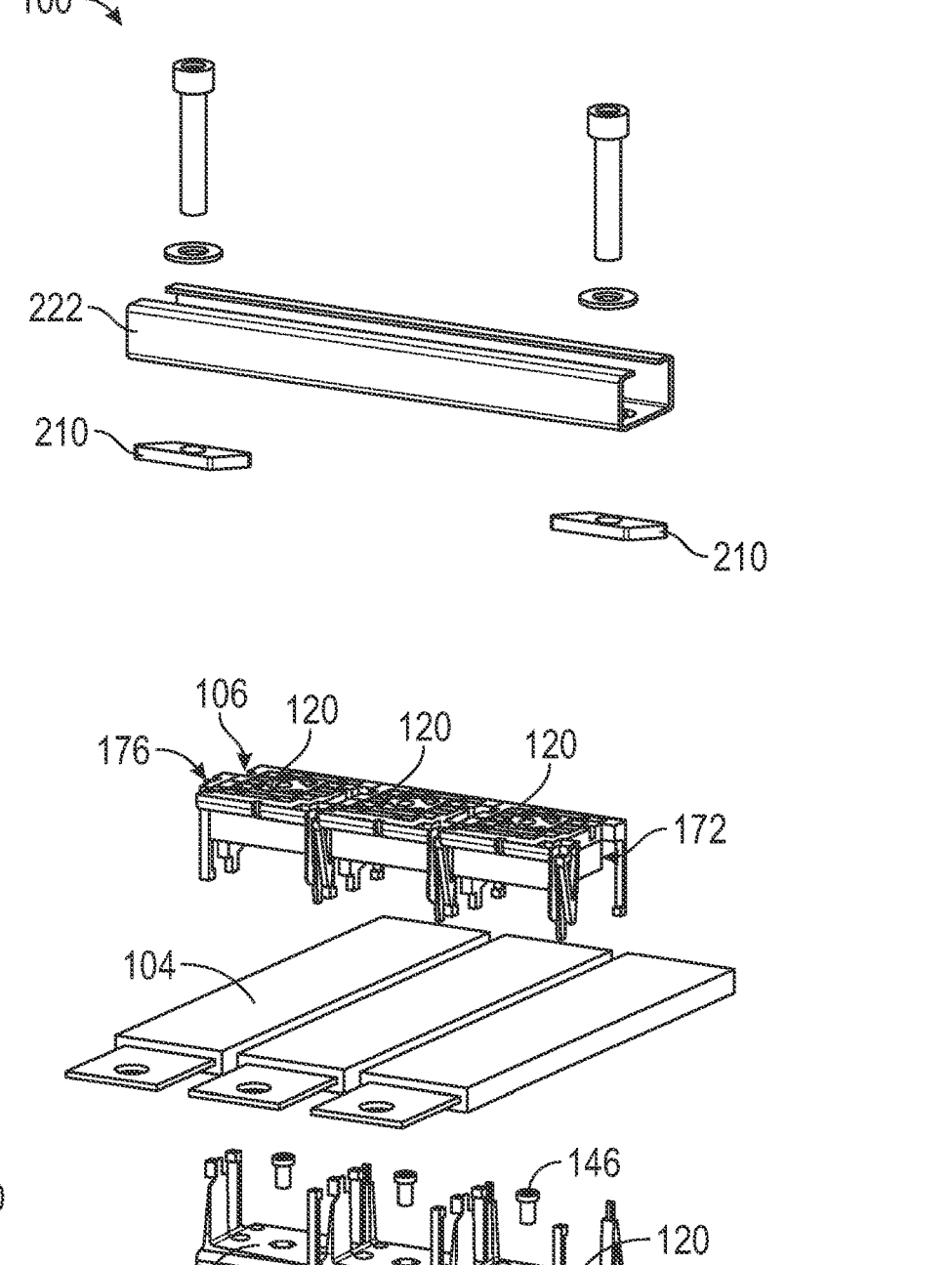
FIG. 16 is an exploded view of a bracing system according to an embodiment of the invention, including end adapters.

In some examples, different spacing can be provided, including with different arrangements of intermediate or end adapters. As shown in FIG. 16, for example, another configuration of the bracing system 100 of FIG. 1 can include the end adapters 208 at either lateral end to assist in securing the various supports 106 between the mounting profiles 108, 222. In this example, however, intermediate adapters have not been included, so as to provide a particularly close packed lateral spacing for the conductors 104 (see also discussion of FIG. 11, above).

Figure 17:
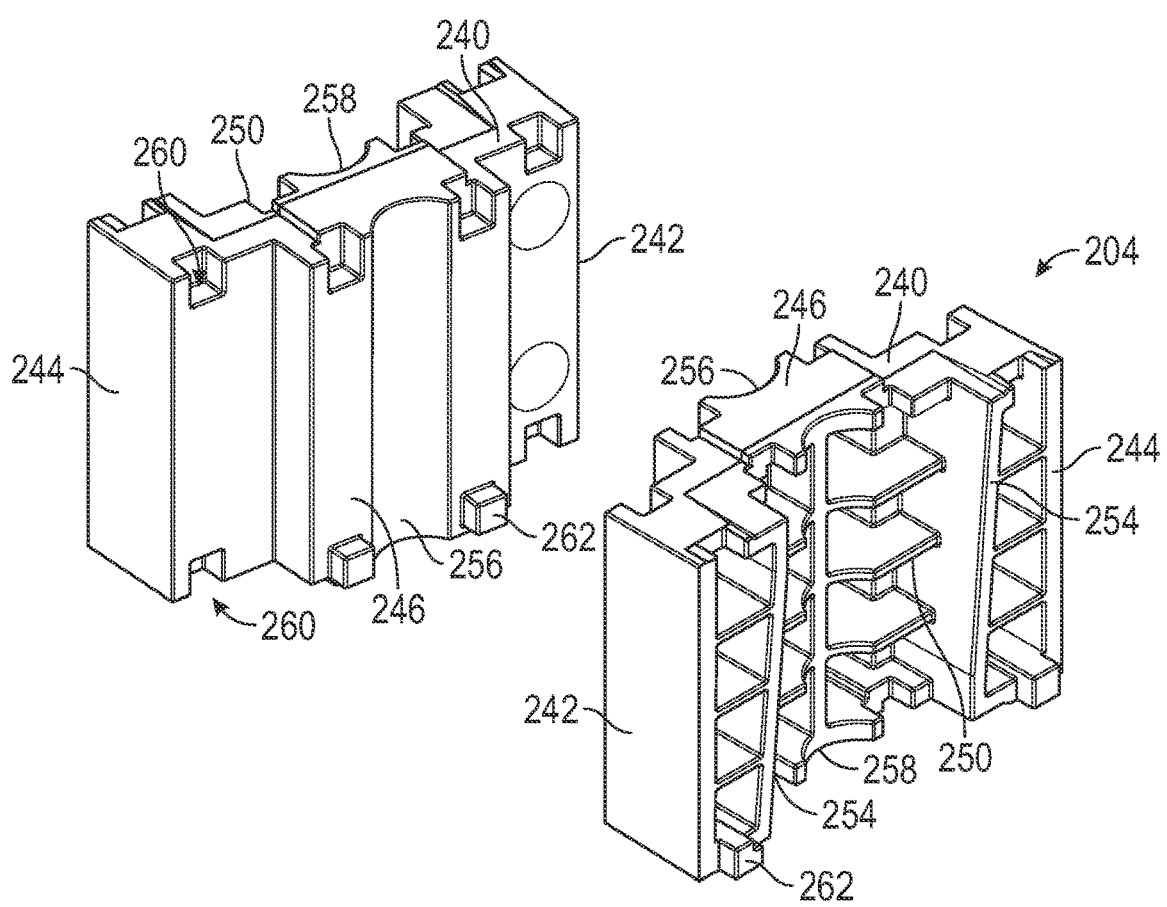
FIG. 17 shows isometric views of an example adapter for bracing systems.
Figure 18:
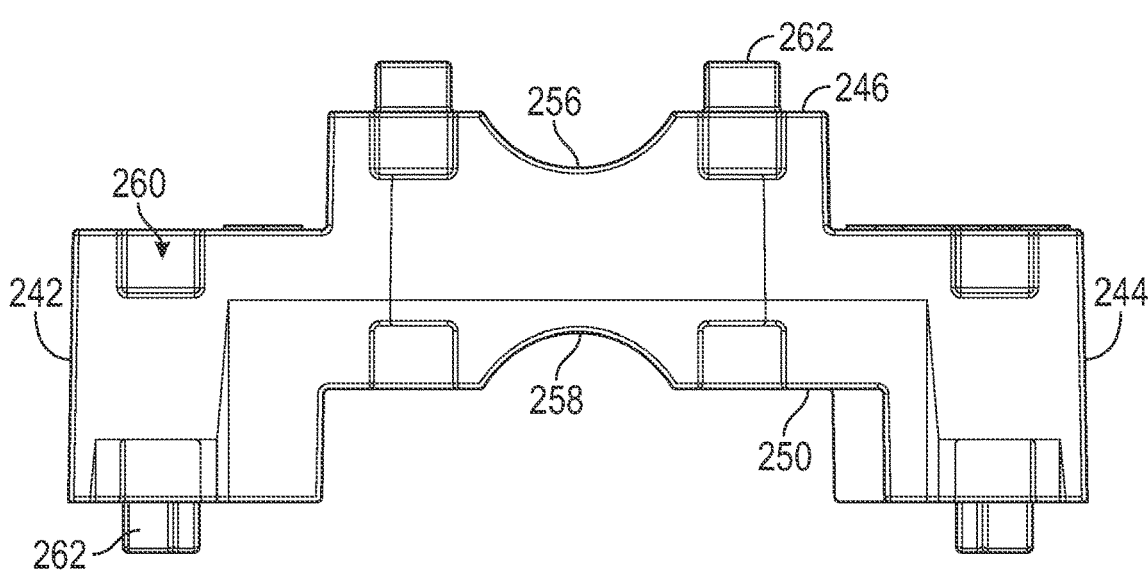
FIG. 18 is a top plan view of the adapter of FIG. 17.

FIGS. 17-18 illustrate an example configuration of the adapter 204 (or the adapter 208). An adapter body 240 of the adapter 204 includes a first side wall 242, a second side wall 244, a laterally protruding end 246 opposite a laterally recessed end 250. The recessed end 250 can include ramped walls 254 that extend in parallel to each other. The protruding end 246 includes a first channel 256 and the recessed end 250 includes a second channel 258, each of which can partially receive a fastener used to clamp the upper and bottom mounting profile 220, 222 together (e.g., a bolt as shown in FIGS. 15 and 16). In some examples, the adapter body may further include a pattern of recesses 260 or studs 262.

As also discussed above, adapters as disclosed herein can be configured to seat between laterally adjacent sets of clip bodies, or at lateral ends of arrays of clip bodies. In this regard, protruding and recessed ends on adapters can be configured to engage with corresponding protruding or recessed features of conductor supports to allow for modular construction of varied arrays of conductor supports. Referring back to FIGS. 15 and 16, for example, the protruding ends 246 of the adapters 204, 208 can be received by the recessed structures 172 of the adjacent conductor supports 106 (partially hidden in FIG. 15). Similarly, the recessed ends 250 of the adapters 204, 208 can receive the protruding structures 176 of the adjacent conductor supports 106 (partially hidden in FIG. 15). Moreover, the recesses 260 and studs 262 can in some cases engage corresponding structures on clip bodies to further assist users in aligning and securing and the relevant array. For example, as shown in FIG. 15, the studs 262 can engage with corresponding recesses 160 on the adjacent support 106. Similarly, as shown in cross-sectional inset in FIG. 15, the ramped walls 254 can engage with the base ends of the legs 136 to secure the adapter 208 (or 204) to the assembled conductor support 106 while also leaving sufficient clearance to disengage the shoulder 138 (e.g., as discussed relative to FIGS. 12A and 12B).

Figure 19:
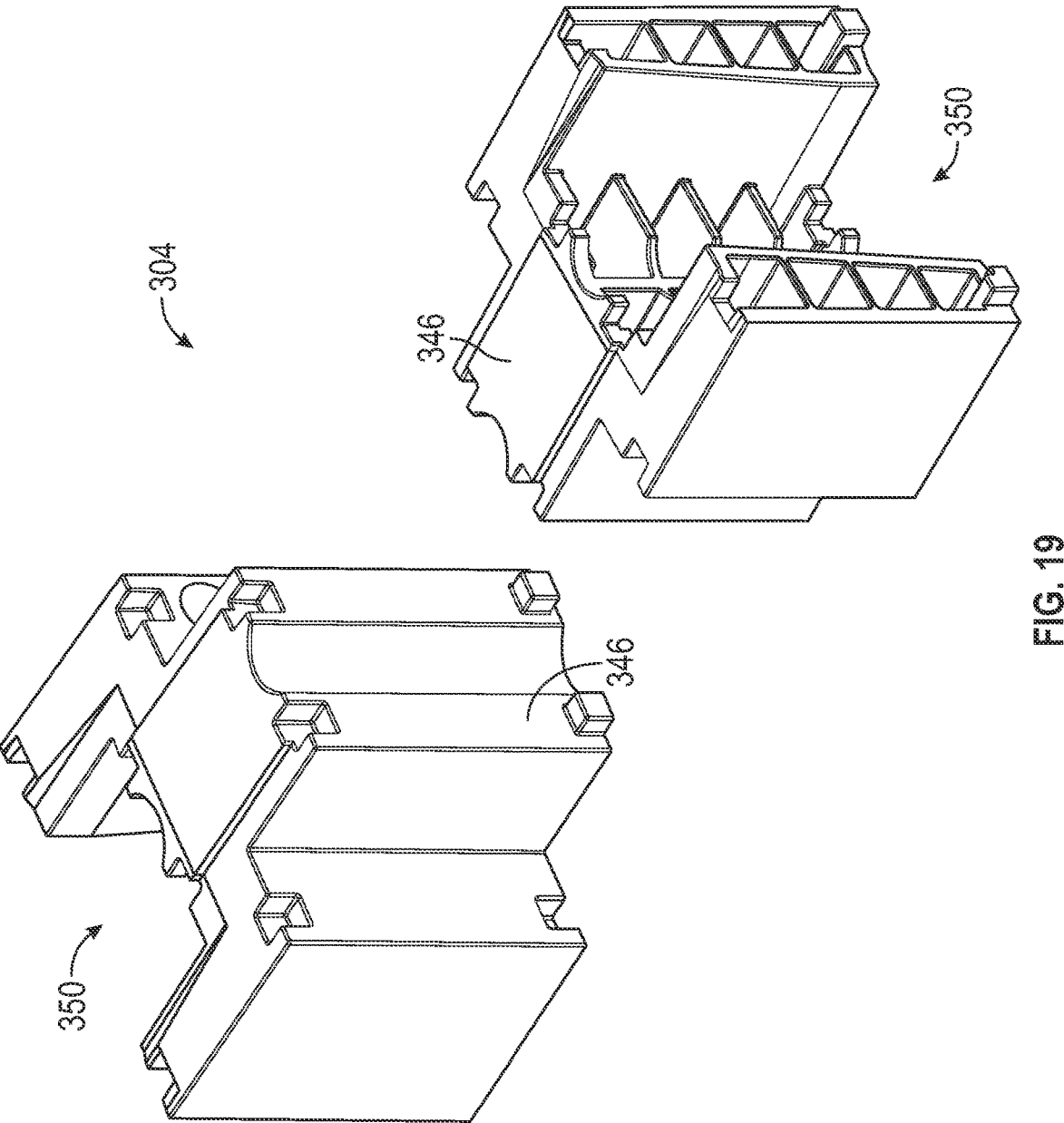
FIG. 19 shows isometric views of another example adapter for bracing systems.

In different examples, recessed and protruding ends of adapters as disclosed herein can be varied similarly to laterally protruding features and recessed areas of conductor supports (e.g., as illustrated in FIG. 14A-14F), for similar inter-engagement of adjacent components. For example, FIG. 19 illustrates an adapter 304 with a more pronounced protruding end 346 and correspondingly deeper recessed end 350. Thus, the adapter 304 can be used with a larger size of conductor support than the adapter 204 of FIG. 17.

Figures 20A, 20B, 20C:
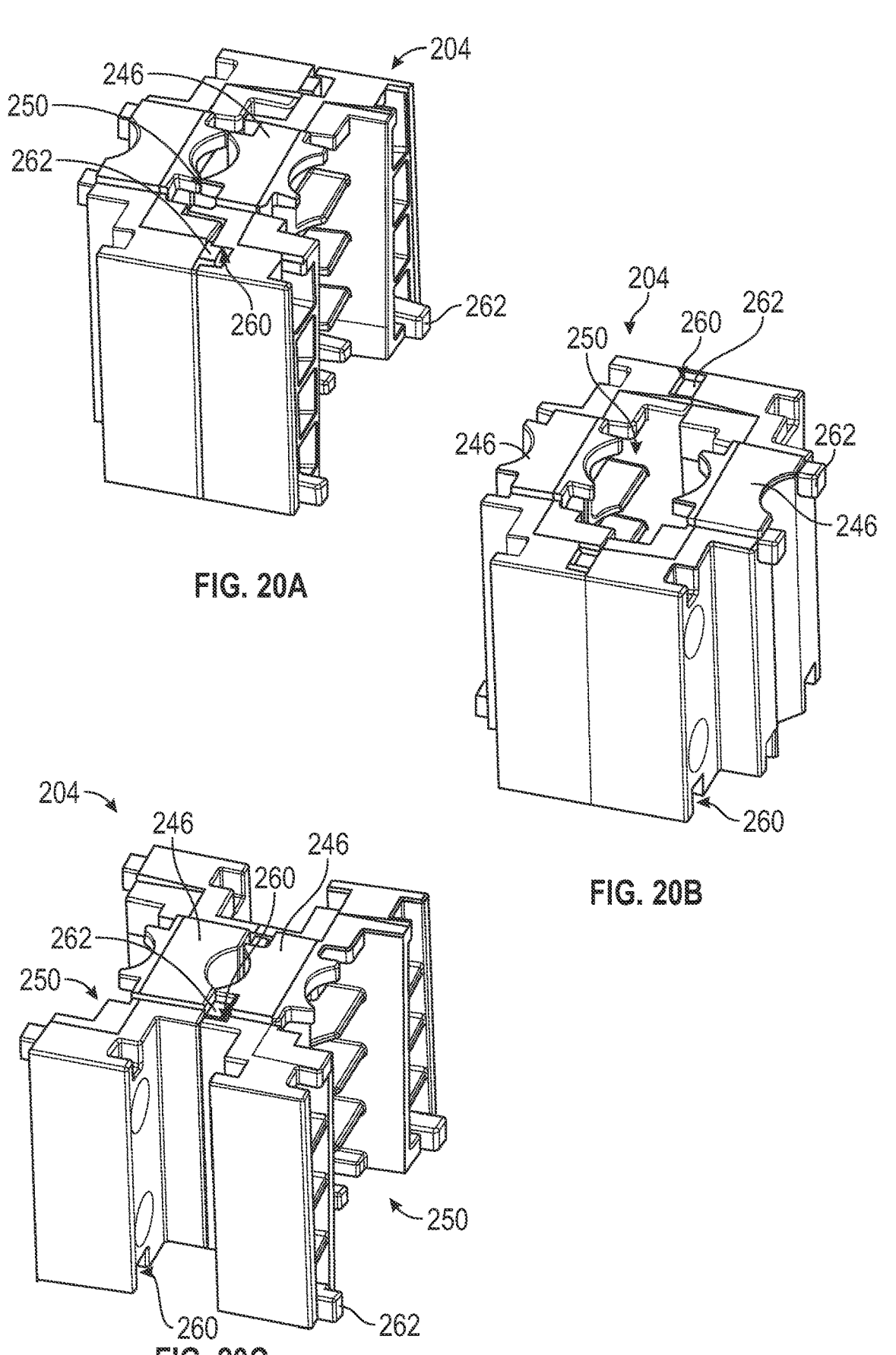
FIGS. 20A-C are isometric views of example configurations of adapters as shown in FIG. 17.

As discussed above, adapters can generally be oriented adjacent to one other or can be coupled together. Referring to FIGS. 20A-20C, for example, the adapter 204 of FIG. 17 can be coupled in various configurations to provide varied spacing (e.g., lateral spacing) between the conductors. For example, FIG. 20A illustrates two of the adapters 204 being coupled with the protruding end 246 of the first adaptor 204A received into the recessed end 250 of the second adapter 204B. FIG. 20B illustrates the adapters 204 being coupled with the recessed ends 250 facing each other, and FIG. 20C illustrates the adapters 204 being coupled opposite of each other along the protruding ends 246. In each such cases, particular studs 262 on one of the adapters 204 can be received into corresponding recesses 260 on the other of the adapters 204 to help to secure the adapters 204 in the illustrated alignment.

Figure 21:
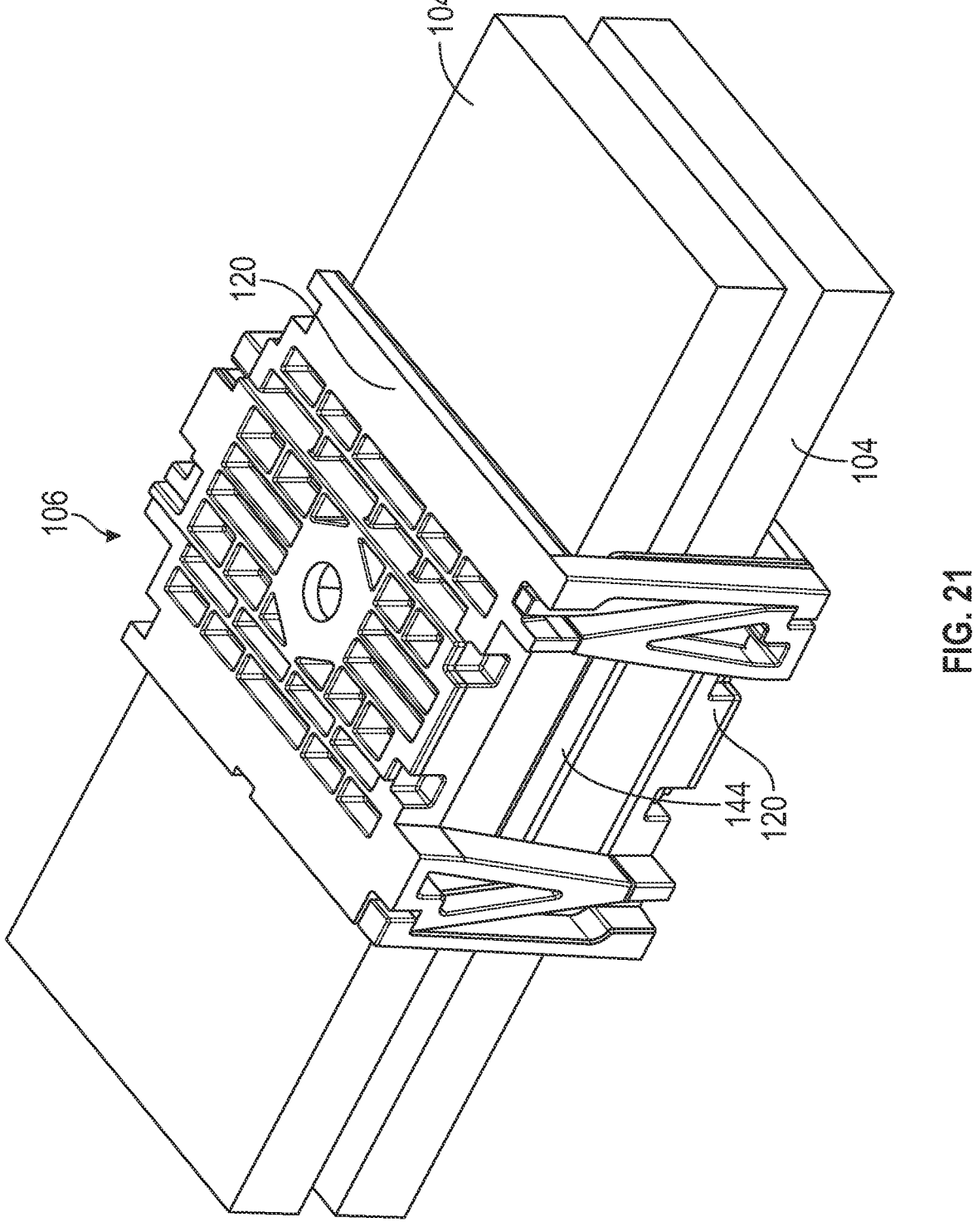
FIG. 21 is an isometric view of a conductor support including multiple conductors.

In some examples, multiple conductors can be secured between two clip bodies. For example, referring to FIG. 21, two of the conductors 104 can be stacked vertically between the clip bodies 120. In some examples, the pad 144 can be disposed between the one or more conductors 104 (e.g., instead of, or in addition to, being disposed between a conductor and a clip body). In some examples, the thickness of the pad 144 can be adjusted based on the thickness of the conductors or other needs of a particular installation. In some examples, multiple pads 144 can be used to adjust the gaps formed between the conductors 104 and the clip bodies 120, or the gap between the conductors 104. Alternatively, in some examples, the conductors 104 can be aligned alongside each other (i.e., laterally arrayed) between the clip bodies 120.

Although embodiments of the invention can be used in other settings, implementation in the illustrated configuration may be particularly advantageous in some cases, including to provide relatively strong retention of conductors against electromagnetically induced forces on conductors in surge events or during a short circuit. Similarly, although particular mounting profiles are shown in the various figures, other structural members (e.g., brackets, building structure, etc.) can be similarly employed to secure examples of the disclosed supports. In this regard, for example, base structures or fastening arrangements for support structures as disclosed herein can also be adaptably varied from those shown (e.g., with a base of a clamp body that is differently formed than shown, to be engageable with various other fastening or support systems, or with different arranged or shaped legs).

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of:

A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "integral" and derivatives thereof (e.g., "integrally") describe elements that are manufactured as a single piece without fasteners, adhesive, or the like to secure separate components together. For example, an element stamped or cast as a single-piece component from a single piece of sheet metal or a single mold (etc.), without rivets, screws, or adhesive to hold separately formed pieces together, is an integral (and integrally formed) element. In contrast, an element formed from multiple pieces that are separately formed initially, then later connected together, is not an integral (or integrally formed) element.

Also as used herein, unless otherwise limited or defined, the term "adjacent" and derivatives thereof (e.g., "adjacently") describes elements that are within less than 25% of a total reference length from a specified feature (e.g., less than 20% of the length, less than 12.5% of the length, or less than 5% of the length).

Also as used herein, unless otherwise defined or limited, the term "lateral" refers to a direction, at least a component of which does not extend in parallel with a reference direction. In particular, in the context of an elongate conductor, the term "lateral" refers to a direction that is locally transverse to the elongate direction of the conductor. In this regard, relative to a conductor support, the term "lateral" refers to a direction transverse to a conductor as received in the conductor support. In some cases, a lateral direction can be a radial (i.e., perpendicularly outward) direction relative to an axis that extends in a reference direction (e.g., a center- or centroid-axis of a conductor of various cross-sections, within a conductor support).

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

Unless otherwise specifically indicated, ordinal numbers are used herein for convenience of reference, based generally on the order in which particular components are presented in the relevant part of the disclosure. In this regard, for example, designations such as "first," "second," etc., generally indicate only the order in which a thus-labeled component is introduced for discussion and generally do not indicate or require a particular spatial, functional, temporal, or structural primacy or order.

What is claimed is:

1. A bracing system for conductors, the bracing system comprising:

a conductor support that includes:

a first clip body that includes a first clip base and first clip catches extending from the first clip base in a first direction, the first clip catches including a first cantilevered leg with a distal shoulder and a first deflector leg with a proximal shoulder; and a second clip body that includes a second clip base and second clip catches extending from the second clip base in a second direction, including a second cantilevered leg with a distal shoulder and a second deflector leg with a proximal shoulder;

the conductor support having a staging configuration in which:

the first clip body and the second clip body are spaced from each other to receive a conductor between the first clip base and the second clip base;

the first deflector leg is aligned to deflect the second cantilevered leg; and the second deflector leg is aligned to deflect the first cantilevered leg; and the conductor support having a secured configuration in which:

the first clip body and the second clip body are spaced from each other to secure the conductor between the first clip base and the second clip base;

the distal shoulder of the first cantilevered leg engages the proximal shoulder of the second deflector leg to secure the first clip body to the second clip body; and the distal shoulder of the second cantilevered leg engages the proximal shoulder of the first deflector leg to secure the first clip body to the second clip body.

2. The bracing system of claim 1, wherein the first deflector leg includes a first angled deflection surface and the second deflector leg includes a second angled deflection surface; and wherein the first and second deflection surfaces are arranged to deflect the first and second cantilevered legs, as the first and second clip bases are moved toward each other in the first or second directions to move the conductor support from the staging configuration to the secured configuration, to move the distal shoulders into alignment with the proximal shoulders.

3. The bracing system of claim 2, wherein, with the conductor support in the secured configuration, the first and second deflector legs seat against each other, along contact surfaces opposite the angled deflection surfaces.

4. The bracing system of claim 1, wherein the first clip catches include:

the first cantilevered leg and the first deflector leg, arranged along a first lateral side of the first clip base; and a third cantilevered leg and a third deflector leg, arranged along a second lateral side of the first clip base; and wherein the second clip catches include:

the second cantilevered leg and the second deflector leg, arranged along a first lateral side of the second clip base; and a fourth cantilevered leg and a fourth deflector leg, arranged along a second lateral side of the second clip base.

5. The bracing system of claim 1, further comprising:

a third clip body that includes a third clip base and third clip catches extending from the third clip base in a third direction; and a fourth clip body that includes a fourth clip base and fourth clip catches extending from the fourth clip base in a fourth direction;

wherein, in a first expanded configuration of the bracing system:

the first and second clip bases are secured together;

the first clip catches extend in the first direction away from the second clip body to engage the third clip catches, to secure the conductor between the first clip base and the third clip base; and the second clip catches extend in the second direction away from the first clip body to engage the fourth clip catches, to secure a second conductor between the second clip base and the fourth clip base.

6. The bracing system of claim 1, further comprising:

a second conductor support that includes a third clip body engaged with a fourth clip body to secure a second conductor therebetween; and a third conductor support that includes a fifth clip body engaged with a sixth clip body to secure a third conductor therebetween;

wherein, in the secured configuration, the first and second clip bodies define a recess that extends into the conductor support transverse to the first and second directions and a protrusion that extends from the conductor support transverse to the first and second directions; and wherein, in a second expanded configuration of the bracing system:

a protrusion of the second conductor support extends into the recess defined by the first and second clip bodies to secure the conductor support and the second conductor support in a laterally extending support array; and a recess of the third conductor support receives the protrusion defined by the first and second clip bodies to secure the conductor support and the third conductor support in the laterally extending support array.

7. The bracing system of claim 1, wherein at least one of the distal shoulders or at least one of the proximal shoulders forms an acute engagement angle.

8. A bracing system to secure one or more conductors, the bracing system comprising:

a conductor support that includes:

a first clip body that includes a first clip base and a plurality of first clip catches that protrude from the first clip base in a first direction, each first clip catch of the plurality of first clip catches including a shoulder; and a second clip body that includes a second clip base and a plurality of second clip catches protruding from the second clip base in a second direction, each second clip catch of the plurality of second clip catches including a shoulder, the conductor support having a secured configuration that secures a conductor between the first clip base and the second clip base, with the plurality of first clip catches extending toward the second clip base, the plurality of second clip catches extending toward the first clip base, and the shoulders of the plurality of first clip catches engaging the shoulders of the plurality of second clip catches to secure the first clip body to the second clip body.

9. The bracing system of claim 8, wherein the first clip body and the second clip body are one or more of:

substantially identical to each other; or rotationally complementary to each other, to be engageable with each other in the secured configuration.

10. The bracing system of claim 8, wherein the first clip base includes a first recessed mounting feature and the second clip base includes a second recessed mounting feature;

wherein the first and second recessed mounting features are arranged to secure the first or second clip base to a support structure with the conductor support in the secured configuration; and wherein the conductor support has a first expanded configuration in which the first and second clip bases are secured together with the first and second recessed mounting features with the plurality of first clip catches extending away from the second clip base and the plurality of second clip catches extending away from the first clip base.

11. The bracing system of claim 8, wherein the plurality of first clip catches and the plurality of second clip catches each includes:

a first catch and a second catch adjacent opposing corners of a first side of the respective first or second clip base; and a third catch and a fourth catch spaced apart from opposing corners of a second side of the respective first or second clip base; and wherein, in the secured configuration, the first and second catches of the first clip engage the third and fourth catches of the second clip and the first and second catches of the second clip engage the third and fourth catches of the first clip.

12. The bracing system of claim 8, wherein, in the secured configuration, the pluralities of first and second clip catches collectively define:

a recess extending into the conductor support on a first lateral side of the conductor support to receive a protrusion of a first adjacent conductor support; and a protrusion extending from the conductor support on a second lateral side of the conductor support to be received into a recess of a second adjacent conductor support.

13. The bracing system of claim 12, further comprising:

a first adapter and a second adapter arranged to be selectively received into the recess of defined by the first clip and second clip catches or receive the protrusion defined by the first clip and second clip catches;

wherein one or more of:

a plurality of conductor supports, including the conductor support, are secured to a rigid support member between the first and second end adapters;

at least one of the first or second adapters is secured between the conductor support and a second conductor support; or the first and second adapters each include a respective opening that receives a threaded fastener to secure two rigid support members together with the plurality of conductor supports therebetween.

14. The bracing system of claim 8 further comprising:

one or more resilient pads arranged between the first clip base and the second clip base, and one or more of:

between the first clip base and the conductor, with the conductor support in the secured configuration, to accommodate a first range of conductor thicknesses; or between the conductor and a second conductor that is also secured between the first and second bases.

15. The bracing system of claim 8, wherein the plurality of first clip catches includes a first cantilevered leg and a first deflector leg, and the plurality of second clip catches includes a second cantilevered leg and a second deflector leg; and wherein the first and second deflector legs are arranged to deflect the first and second cantilevered legs, respectively, as the first and second clip bodies are moved in the first or second direction toward the secured configuration, to move the shoulders of the first and second cantilevered legs into engagement with the shoulders of the first and second deflector legs.

16. The bracing system of claim 15, wherein one or more of the first deflector leg or the second deflector leg includes:

a deflection surface arranged to deflect, respectively, the second or first cantilevered leg; and a guide surface that extends away from the first or second clip base in the first or the second direction, respectively, past the deflection surface.

17. The bracing system of claim 15, wherein, with the conductor support in the secured configuration, the first deflector leg contacts the second deflector leg to prevent further movement of the first clip body toward the second clip body.

18. A method of securing one or more conductors using a conductor support that includes a first clip body and a second clip body, the method comprising:

securing a first clip base of the first clip body to a support structure in alignment with an electrical device;

aligning the first clip body and a second clip body of the conductor support in a staging configuration, in which:

the first clip base is spaced by a first distance from a second clip base of the second clip body;

first clip catches extend from the first clip base, in a first direction, toward the second clip base;

second clip catches extend from the second clip base, in a second direction, toward the first clip body; and a conductor extends between the first clip base and the second clip base; and securing the conductor between the first clip base and the second clip base to secure the conductor in alignment for connection with the electrical device, by moving the first and second clip bases toward each other in the first or second directions to engage shoulders of the first clip catches with shoulders of the second clip catches and secure the first clip body to the second clip body with the second clip base spaced from the first clip base by a second distance that is smaller than the first distance.

19. The method of claim 18, wherein moving the first and second clip bases toward each other causes cantilevered legs of the first clip catches and the second clip catches to be deflected by deflector legs of the first clip catches and the second clip catches, to align the shoulders of the first clip catches to engage the shoulders of the second clip catches.

20. The method of claim 19, further comprising:

removing the second clip body from the first clip body by releasing the shoulders of the first clip catches from the shoulders of the second clip catches, including inserting a tool along a deflector surface of at least one of the deflector legs to release the shoulder of at least one of the cantilevered legs.

\* \* \* \* \*